(12) United States Patent
Takano et al.

(10) Patent No.: US 10,812,004 B2
(45) Date of Patent: Oct. 20, 2020

(54) MOTOR SYSTEM INCLUDING RELUCTANCE MOTOR

(71) Applicant: Nidec Corporation, Kyoto (JP)

(72) Inventors: Yuichi Takano, Kyoto (JP); Keita Fukushima, Kyoto (JP); Tomohiro Fukumura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/347,205

(22) PCT Filed: Oct. 27, 2017

(86) PCT No.: PCT/JP2017/038992
§ 371 (c)(1),
(2) Date: May 3, 2019

(87) PCT Pub. No.: WO2018/084093
PCT Pub. Date: May 11, 2018

(65) Prior Publication Data
US 2020/0059188 A1 Feb. 20, 2020

(30) Foreign Application Priority Data
Nov. 4, 2016 (JP) .................. 2016-216077

(51) Int. Cl.
*H02P 25/098* (2016.01)
*H02P 25/086* (2016.01)

(52) U.S. Cl.
CPC .................. *H02P 25/086* (2013.01)

(58) Field of Classification Search
CPC ......... H02K 19/10; H02K 19/36; H02P 25/08
See application file for complete search history.

(56) References Cited

U.S. PATENT DOCUMENTS

| | | | |
|---|---|---|---|
| 5,929,590 A | 7/1999 | Tang | |
| 6,400,107 B1 | 6/2002 | Nakatani et al. | |
| 2004/0114290 A1 | 6/2004 | Kehrli | |
| 2012/0169267 A1 | 7/2012 | Nashiki et al. | |
| 2016/0190967 A1* | 6/2016 | Takano | H02P 25/086 |
| | | | 318/254.1 |
| 2016/0241179 A1* | 8/2016 | Matsunawa | H02P 25/08 |

FOREIGN PATENT DOCUMENTS

| | | |
|---|---|---|
| JP | 1-264590 A | 10/1989 |
| JP | 4-21391 A | 1/1992 |
| JP | 8-116651 A | 5/1996 |

OTHER PUBLICATIONS

Takano et al., "Reluctance Motor and Motor System Including Reluctance Motor", U.S. Appl. No. 16/347,204, filed May 3, 2019.

* cited by examiner

*Primary Examiner* — Muhammad S Islam
(74) *Attorney, Agent, or Firm* — Keating & Bennett, LLP

(57) ABSTRACT

A motor system includes a reluctance motor and a circuit connected to the reluctance motor. The reluctance motor includes a rotor including N rotor salient poles where N is an integer of 2 or more, a stator including M stator salient poles where M is an integer of 3 or more, 3-phase coils to excite the stator salient poles, and a sensor to detect a rotational position of the rotor. The circuit applies 120-degree conduction to the 3-phase coils when the rotor is rotated in a first direction from a stopped state (initial position), and applies 180-degree conduction to the 3-phase coils when the rotor is rotated in a second direction that is opposite to the first direction from the stopped state.

11 Claims, 23 Drawing Sheets

MOTOR SYSTEM INCLUDING RELUCTANCE MOTOR

CROSS REFERENCE TO RELATED APPLICATIONS

This is the U.S. national stage of application No. PCT/JP2017/038992, filed on Oct. 27, 2017, and priority under 35 U.S.C. § 119(a) and 35 U.S.C. § 365(b) is claimed from Japanese Application No. 2016-216077, filed Nov. 4, 2016; the entire contents of which are incorporated herein by reference.

1. FIELD OF THE INVENTION

This application relates to a motor system including a reluctance motor.

2. BACKGROUND

Reluctance motors requiring no permanent magnet have been studied. The term "reluctance" means magnetic resistance (magnetic reluctance). The magnetic resistance refers to a degree of difficulty for magnetic flux to flow in a magnetic circuit. The reluctance motor performs rotational driving using a reluctance torque rather than a magnet torque caused by a permanent magnet. To generate the reluctance torque, a rotor and a stator have a double salient structure.

The reluctance motor is broadly classified into a switched reluctance motor and a synchronous reluctance motor. In the switched reluctance motor, self-inductance changes in accordance with the rotational position of the rotor, generating the reluctance torque. In the synchronous reluctance motor, both of self-inductance and mutual inductance change in accordance with the rotational position of the rotor, generating the reluctance torque.

As compared to a widespread permanent magnet motor and an induction motor, the reluctance motor has a different torque generation mechanism that requires more special control. Basic characteristics of the reluctance motor are not necessarily definite. Thus, the controller for the reluctance motor has to be independently designed in accordance with the structure of the adopted reluctance motor.

Conventionally, a method of detecting a rotor angular position (initial phase position) for activating a switched reluctance motor in a stationary state is known.

According to the conventional method, a pulse voltage is applied to a coil of a motor to detect a position of the rotor stopped. This application describes that, in order to rotate the rotor in a rotational direction desired, a predetermined time is given to prevent a current passing through the coil from being inverted. Thus, a substantial time is taken to rotate the rotor in a direction desired, which degrades the starting characteristic.

SUMMARY

A motor system according to an example embodiment of the present disclosure includes a reluctance motor and a circuit connected to the reluctance motor, and the reluctance motor has a rotor including N rotor salient poles where N is an integer of 2 or more, a stator having M stator salient poles where M is an integer of 3 or more, 3-phase coils to excite the stator salient poles, and a sensor to detect a rotational position of the rotor. The circuit applies 120-degree conduction to the 3-phase coils when the rotor is rotated in a first direction from a stopped state, and applies 180-degree conduction to the 3-phase coils when the rotor is rotated in a second direction that is opposite to the first direction from the stopped state.

The above and other elements, features, steps, characteristics and advantages of the present disclosure will become more apparent from the following detailed description of the preferred example embodiments with reference to the attached drawings.

BRIEF DESCRIPTION OF THE DRAWINGS

FIG. 18 is a view illustrating another relation (excitation pattern) between the rotor position and the excitation state of the stator salient pole in an example embodiment of the present disclosure.

DETAILED DESCRIPTION

Motor systems according to example embodiments of the present disclosure include a reluctance motor and a circuit connected to the reluctance motor. A reluctance motor of an example embodiment of the present disclosure has a rotor having N (N is an integer of 2 or more) rotor salient poles, a stator having M (M is an integer of 3 or more) stator salient poles, 3-phase coils configured to excite the stator salient poles, and a sensor configured to detect a rotational position of the rotor. The circuit applies 120-degree conduction to the 3-phase coils when the rotor is rotated in a first direction from a stopped state (initial position), and applies 180-degree conduction to the 3-phase coils when the rotor is rotated in a second direction that is opposite to the first direction from the stopped state.

The motor system according to the example embodiment of the present disclosure adopts an excitation pattern according to a desired rotational direction of the rotor and therefore, may generate a torque in the desired direction to uniquely determine the rotational direction. More specifically, when the rotor is rotated in the first direction from the stopped state (initial position), the motor system may generate a torque causing rotation in the first direction irrespective of the stopped position of the rotor. When the rotor is rotated in the second direction from the stopped position, the motor system may generate a torque causing rotation in the second direction irrespective of the stopped position of the rotor. Thus, the torque in the desired direction may be generated to uniquely determine the rotational direction, thereby improving the starting characteristic.

A non-limiting exemplary example embodiment of the motor system of the present disclosure will be described below.

First, referring to FIGS. 1A and 1B, the basic structure of the reluctance motor included in the motor system in the present example embodiment will be described below. The reluctance motor in the present example embodiment is a switched reluctance motor. Hereinafter, the "switched reluctance motor" will be referred to as merely "SR motor".

Figure 1A:
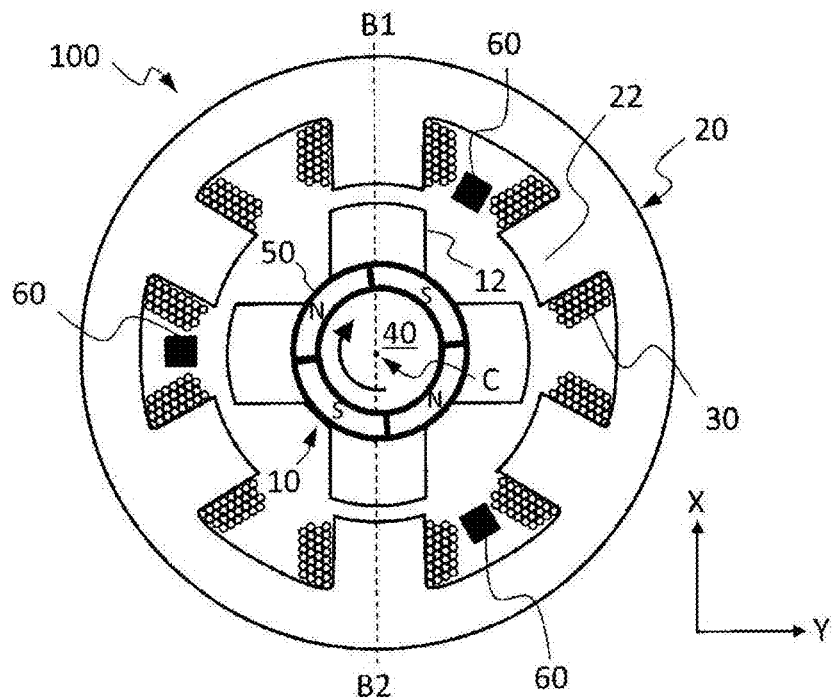
FIG. 1A is a sectional view of an SR motor according to an example embodiment of the present disclosure when viewed from a sensor magnet side.
Figure 1B:
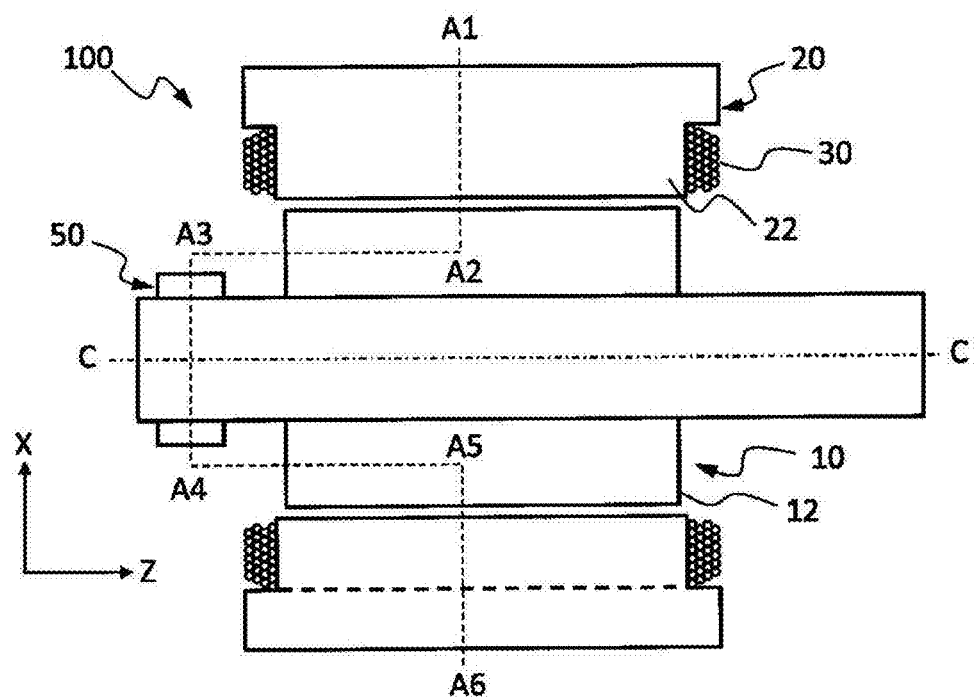
FIG. 1B is a sectional view taken along the line B1-B2 in FIG. 1A.

FIG. 1A is a sectional view of an SR motor 100 in the present example embodiment when viewed from a sensor magnet side. FIG. 1B is a sectional view taken along a line B1-B2 in FIG. 1A. FIG. 1A illustrates a cross-section taken along a line A1-A2, a line A3-A4, and a line A5-A6 in FIG. 1B. FIGS. 1A and 1B illustrate a portion of a right-handed XYZ coordinate system including mutually-orthogonal X axis, Y axis, and Z axis. The cross-section illustrated in FIG. 1A is the cross-section when viewed from the negative side toward the positive side of the Z axis that is parallel to a rotational center axis C. In the present disclosure, the negative side of the Z axis is the side (left side in FIG. 1B) of a below-mentioned sensor magnet 50 of the SR motor 100. The orientation of the SR motor 100 in the drawings does not limit the orientation of the reluctance motor of the present disclosure in use.

In the present disclosure, when the motor is viewed from the negative side toward the positive side of the Z axis, that is, from the side of the sensor magnet (left side in FIG. 1B), clockwise rotation is defined as "normal rotation". In this case, counterclockwise rotation is defined as "reverse rotation (counter rotation)". A curved arrow in FIG. 1A represents the direction of "normal rotation (positive rotation)".

The SR motor 100 in the present example embodiment includes a rotor 10 having four rotor salient poles 12 and a stator 20 having six stator salient poles 22. Like the rotor and the stator of the well-known SR motor, the rotor 10 and the stator 20 may have various shapes and dimensions according to use. The rotor and the stator 20 are preferably made of a soft magnetic material, for example, may be formed of stacked silicon steel plates of any shape.

The number of the rotor salient poles 12 is not limited to four, and may be N (N is an integer of 2 or more). The number of the stator salient poles 22 is not limited to six, and may be M (M is an integer of 3 or more). The number of the rotor salient poles 12 may be referred to as "pole number", and the number of the stator salient poles 22 may be referred to as "slot number". The "slot" in the stator 20 means a space (recess) between the two stator salient poles 22 adjacent in the circumferential direction. The number of slots is equal to the number of stator salient poles 22. The structure including the N rotor salient poles 12 and the M stator salient poles 22 may be referred to as "M-N structure" or "M slot N pole structure". Hereinafter, the SR motor having the "6-4 structure" according to the example embodiment of the present disclosure will be described below. However, the reluctance motor included in the motor system of the present disclosure is not limited to the example embodiment. For example, the motor may have the "3-2 structure" or the "6-2 structure".

The SR motor 100 in the present example embodiment includes 3-phase coils 30 that excite the stator salient poles 22 and a rotating shaft 40 connected to the rotor 10. The coil 30 in this example is concentrated winding, and is connected to an inverter (not illustrated in FIGS. 1A and 1B) as described later. The inverter applies a voltage for the operation of the SR motor 100 to the desired coil 30 to pass a current (drive current) to the coil 30. When the current passes the coil 30, the stator salient pole 22 in the coil 30 is excited to generate a magnetic flux. The magnetic flux is incident from the excited stator salient pole 22 to the near rotor salient pole 12 via a magnetic gap, generating a magnetic circuit closed in the rotor 10 and the stator 20. When a current having a suitable magnitude corresponding to the rotational position of the rotor 10 passes each coil 30 at appropriate timing, the rotor 10 is rotated in a predetermined direction by a required torque. In the present disclosure, the 3-phase coils 30 are U, V, and W-phase coils, respectively. In the following description, the stator salient pole 22 around which the U-phase coil 30 is wound is referred to as "U-phase salient pole", the stator salient pole 22 around which the V-phase coil is wound is referred to as "V-phase salient pole", and the stator salient pole 22 around which the W-phase coil is wound is referred to as "W-phase salient pole".

In general, the reluctance motor rotates in accordance with the same principle as the principle of an electromagnet attracting a piece of iron. The excited stator salient pole 22 corresponds to an "electromagnet", and the rotor salient pole 12 near the excited stator salient pole 22 corresponds to a "piece of iron". When the orientation of the current passing through the coil 30 is inverted, the direction of the generated magnetic flux is also inverted. However, the force with which the "electromagnet" attracts the "piece of iron" does not depend on the orientation of the current passing through the coil 30.

The shaft 40 is rotatably supported by a bearing not illustrated. Since the shaft 40 is fixed to the rotor 10, the rotor 10 rotates with the shaft 40. The shaft 40 may transmit the torque to a load via a mechanical component such as a gear not illustrated.

The SR motor 100 includes the sensor magnet 50 fixed to the outer circumference of the shaft 40, and a plurality of magnetic sensors 60 disposed opposed to the sensor magnet 50. The sensor magnet 50 has S poles and N poles alternately arranged in the circumferential direction (rotational direction) of the shaft 40. The sensor magnet 50 in the present example embodiment has four magnetic poles in total of the S pole, the N pole, the S pole, and the N pole which are arranged in the circumferential direction. Since the sensor magnet 50 is fixed to the shaft 40, with the rotation of the rotor 10, the sensor magnet 50 rotates around the rotational center axis C along with the shaft 40. Meanwhile, the magnetic sensors 60 are fixed to the stator 20. In response to a change in the magnetic flux or magnetic field, which is generated by the sensor magnet 50 rotating with the shaft 40, each of the three magnetic sensors 60 outputs a current or voltage signal. Each of the magnetic sensors 60 may be a Hall IC. The Hall IC may detect timing at which the magnetic pole of the opposed sensor magnet 50 changes from the S pole to the N pole, changing the voltage level of an output signal from logical low (Low) to logical high (High), and may detect timing at which the magnetic pole changes from the N pole to the S pole, changing the voltage level of the output signal from High to Low. By disposing the three Hall ICs that are magnetic sensors at predetermined angular intervals, the angular position of the rotor 10 may be detected based on the output signal from each of the Hall ICs.

In the SR motor 100 in the present example embodiment, the number of poles of the sensor magnet 50 (the sum of the number of the S pole and the number of the N pole) is four that is equal to the number of the rotor salient poles 12. In other words, the number of poles of the sensor magnet 50 is equal to the number N of the rotor salient poles 12. Conventionally, to appropriately rotate the rotor 10 in a predetermined direction at the start of the SR motor 100, it has been considered that the position of the rotor 10 in a stopped state before rotation has to be correctly detected. Thus, the position of the rotor 10 has been conventionally detected using an expensive rotational angle sensor such as a resolver or a rotary encoder. In using the magnetic sensor such as a Hall IC, it has been considered to set the number of the poles of the sensor magnet 50 to be twice as many as the number N of the rotor salient poles 12 or more.

Figure 2:
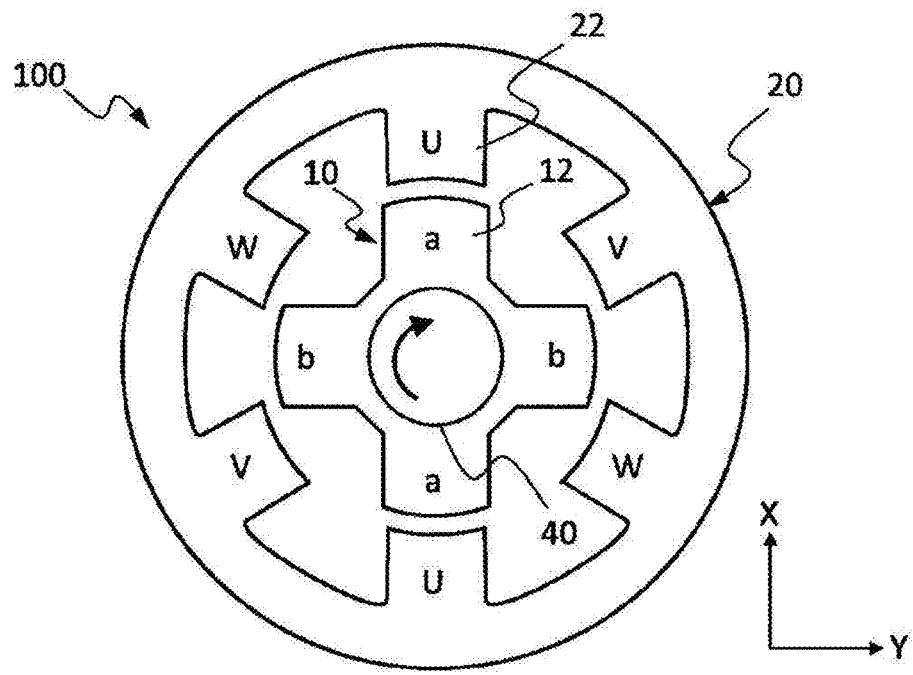
FIG. 2 is a schematic view of a cross section of an SR motor 100 perpendicular to the rotational center axis C.
Figure 3:
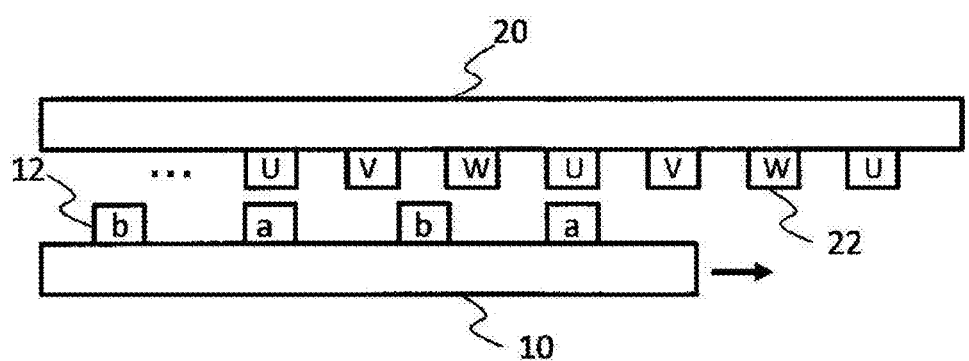
FIG. 3 is a schematic view illustrating the relative positional relation between a rotor 10 and a stator 20 of the SR motor 100 in the circumferential direction of rotation.

Referring to FIGS. 2 and 3, the detection of the position of the rotor 10 is described in more detail. FIG. 2 schematically illustrates a cross section of the SR motor 100 in the present example embodiment, which is cut perpendicularly to the rotational center axis C. FIG. 2 illustrates a cross section taken along a line A1-A2, a cross section taken along a line A2-A5, and a cross section taken along a line A5-A6 when viewed from the sensor magnet side in FIG. 1B. For simplification, FIG. 2 does not illustrate the coils 30.

The symbols "U", "V", and "W" in FIG. 2 denote the "U-phase salient pole", the "V-phase salient pole", and the "W-phase salient pole" of the stator 20, respectively. The symbols "a" and "b" in FIG. 2 each are assigned to a pair of rotor salient poles 12 having 360 degrees in an electrical angle (180 degrees in a mechanical angle) therebetween among the four rotor salient poles 12. In the following description, the rotor salient pole 12 represented by the symbol "a" is referred to as "rotor salient pole 12a", and the rotor salient pole 12 represented by the symbol "b" is referred to as "rotor salient pole 12b".

FIG. 3 is a schematic view of the relative positional relation between the rotor 10 and the stator 20 in the circumferential direction of rotation. For simplification, FIG. 3 illustrates the arrangement relation in which a curved line extending in the circumferential direction of rotation is converted into a straight line extending in a lateral direction. In the example illustrated in FIG. 3, the rotor 10 moves in the direction represented by an arrow with respect to the stator 20 in a stationary state. The direction represented by the arrow indicates the direction of "normal rotation". The symbols "U", "V", and "W", and the symbols "a" and "b" in FIG. 3 are assigned to the components corresponding to the components having the same symbols in FIG. 2.

To move (normally rotate) the rotor 10 in the direction represented by the arrow in FIG. 3, it is preferred to detect the position (angular position) of the rotor 10 with respect to the stator 20, and select the salient pole to be excited from among the "U-phase salient pole", the "V-phase salient pole", and the "W-phase salient pole" according to the position detected. If the selection is inappropriate, the rotor 10 is not able to acquire a torque in a particular direction and oscillates side to side in FIG. 3.

Figure 4A:
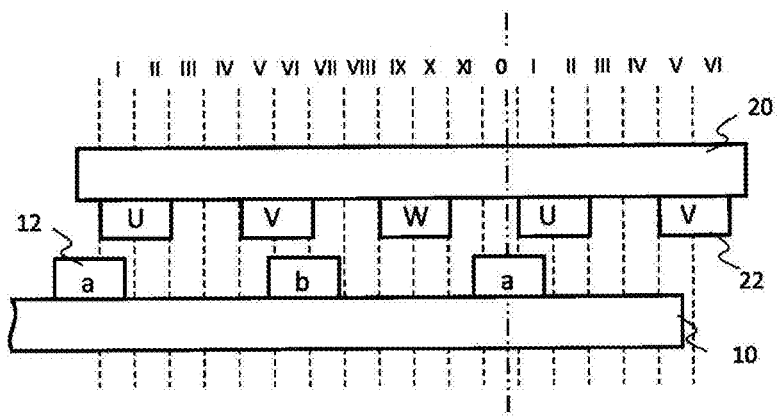
FIG. 4A is a schematic view illustrating the relative positional relation between the rotor 10 and the stator 20 in the circumferential direction of rotation in the case where the range of 360 degrees in the electrical angle is divided into 12 angular zones 0 to XI.
Figure 4B:
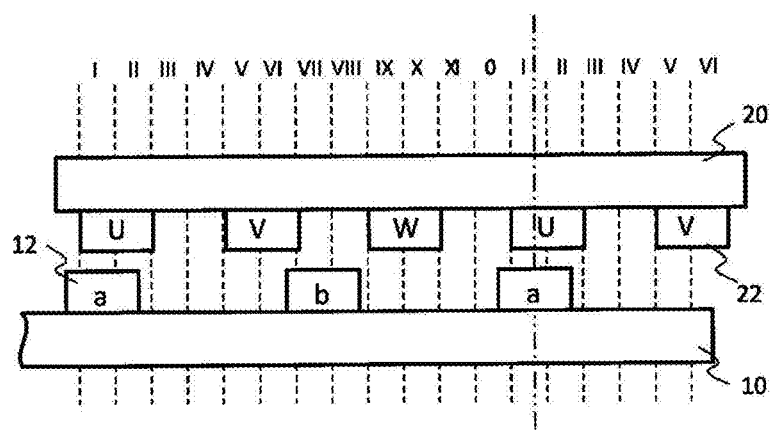
FIG. 4B is a schematic view illustrating another relative positional relation between the rotor 10 and the stator 20 in the circumferential direction of rotation in the case where the range of 360 degrees in the electrical angle is divided into 12 angular zone 0 to X1.

FIG. 4A illustrates an example in which the range of 360 degrees in an electrical angle from the "U-phase salient pole" where the stator 20 is present to the next "U-phase salient pole" through the "V-phase salient pole" and the "W-phase salient pole" is divided into 12 angular zones 0 to XI. The width of each angular zone is 30 degrees in the electrical angle. Here, the rotor salient pole 12 represented by the reference symbol "a" is noted. In the example illustrated in FIG. 4A, the central position (represented by a two-dot chain line in the figure) of the noted rotor salient poles 12a in the circumferential direction is located in the angular zone 0. In this case, the "U-phase salient pole" is selected and excited to generate a torque for moving the rotor 10 to the right. Assuming that, then, the rotor 10 moves to the right side to achieve the arrangement illustrated in FIG. 4B. At this time, the central position (two-dot chain line) of the noted rotor salient pole 12a in the circumferential direction is located in the angular zone I. In a conventional manner, at the timing when the central position of the noted rotor salient pole 12a in the circumferential direction moves from the angular zone 0 to the angular zone I, excitation of the "U-phase salient pole" is stopped, and the "W-phase salient pole" is selected and excited.

Figure 4C:
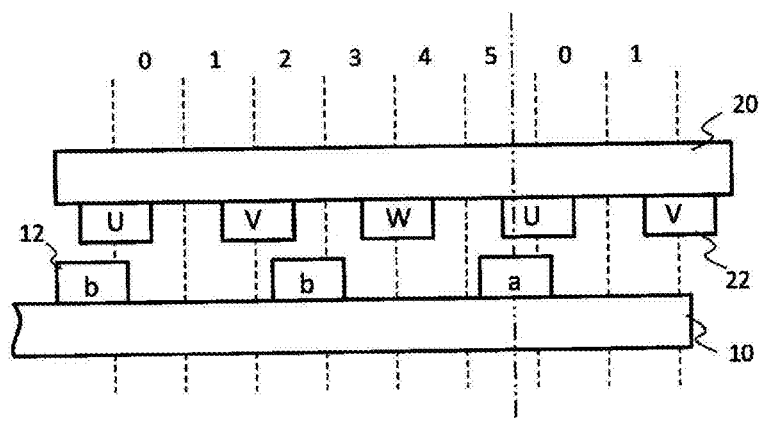
FIG. 4C is a schematic view illustrating the relative positional relation between the rotor 10 and the stator 20 in the circumferential direction of rotation in the case where the range of 360 degrees in the electrical angle is divided into 6 angular zones 0 to 5.

As described above, according to the technical common sense, it is assumed that the position of the rotor 10 has to be detected with accuracy of dividing the range of 360 degrees in the electrical angle into 12 angular zones (angular resolution of 30 degrees in the electrical angle). To achieve the resolution, it has been viewed preferable to set the number of poles of the sensor magnet 50 to twice as many as the number of salient poles N of the rotor 10 or more. On the contrary, it is sufficient for the reluctance motor included in the motor system of the present disclosure, for example, as illustrated in FIG. 4C, to divide the range of 360 degrees in the electrical angle into six angular zones. In this case, the number of poles of the sensor magnet 50 may be the number of salient poles of the rotor, that is, N. Even when the position detection accuracy (angular resolution) is reduced, the rotor 10 may be suitably rotated in a predetermined direction by performing driving as mentioned below.

Figure 5:
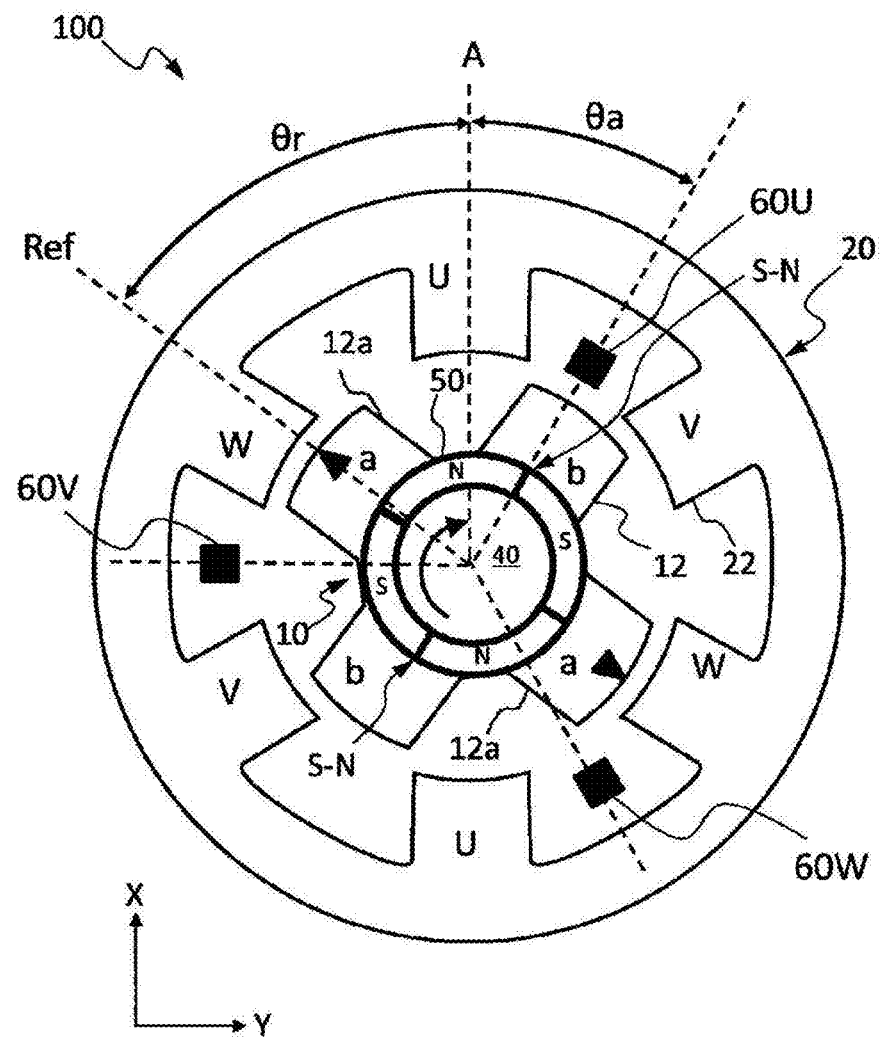
FIG. 5 is a view of the SR motor according to an example embodiment of the present disclosure when viewed from the sensor magnet side.

Next, with reference to FIG. 5, the configuration of the SR motor 100 in the present example embodiment is described in more detail. Like FIG. 1A, FIG. 5 is a sectional view of the SR motor 100 when viewed from the sensor magnet side.

In the present example embodiment, the three magnetic sensors 60 are configured of a first magnetic sensor 60U located at a first position, a second magnetic sensor 60V located at a second position rotated from the first position by 120 degrees+360 degrees×m in the electrical angle in the circumferential direction of the shaft 40, and a third magnetic sensor 60W located at a third position rotated from the first position by 240 degrees+360 degrees×n in the circumferential direction of the shaft 40. In the illustrated example, m and n are 1 and 0, respectively, but may be any other pair of integers. In the example illustrated in FIG. 5, the three magnetic sensors 60U, 60V, and 60W are three Hall ICs located at intervals of 120 degrees in a mechanical angle.

In the exemplary arrangement illustrated in FIG. 5, the first position rotates clockwise by an angle θa from a direction A connecting the circumferential center to the rotational center in the U-phase salient pole. In the present example embodiment, the angle θa is preferably 60 degrees in the electrical angle (30 degrees in the mechanical angle). The angle θa is preferably determined to reduce the effect of the magnetic flux leaked from the coil 30 of the stator salient poles 22 on the magnetic sensors 60 and is not limited to 60 degrees in the electrical angle. As long as the effect of the leaked magnetic flux is not exerted on the magnetic sensors 60, the angle θa may be any angle.

In FIG. 5, the circumferential center of the rotor salient pole 12a represented by the reference symbol "a" is expressed by a black triangle. In the state illustrated in FIG. 5, the circumferential center of the rotor salient pole 12a is located at a "reference position (Ref)" rotated counterclockwise (reverse rotation) by an angle θr from the direction A. The angle θr in the preferred example embodiment is 105 degrees in the electrical angle. In the present example embodiment, this angle is 52.5 degrees in the mechanical angle. In the following description, the rotational angle (electrical angle) of the circumferential center in the rotor salient pole 12 with respect to the reference position (Ref) is defined as the rotational position of the rotor 10, and is merely referred to as "rotor position". In the state illustrated in FIG. 5, the rotor position is 0 degrees. When the rotor 10 normally rotates, the rotor position increases from 0 degrees. When the rotor 10 reversely rotates, the rotor position decreases from 0 degrees (=360 degrees).

In the exemplary arrangement illustrated in FIG. 5, when the rotor position is at 0 degrees, one of boundary positions (S-N) between the S poles and the N poles in the sensor magnet 50 is opposed to the first magnetic sensor 60U. Accordingly, when the rotor position passes through the position of 0 degrees while the rotor 10 normally rotates, the voltage level of the output signal of the first magnetic sensor 60U changes from Low to High. In the present example embodiment, when the rotor 10 normally rotates, the excitation of the U-phase salient pole is started at the timing when the voltage level of the output signal of the first magnetic sensor 60U changes from Low to High. The excitation of the U-phase salient pole continues until the rotor 10 rotates by 120 degrees in the electrical angle and the voltage level of the output signal of the second magnetic sensor 60V changes from Low to High.

Figure 6:
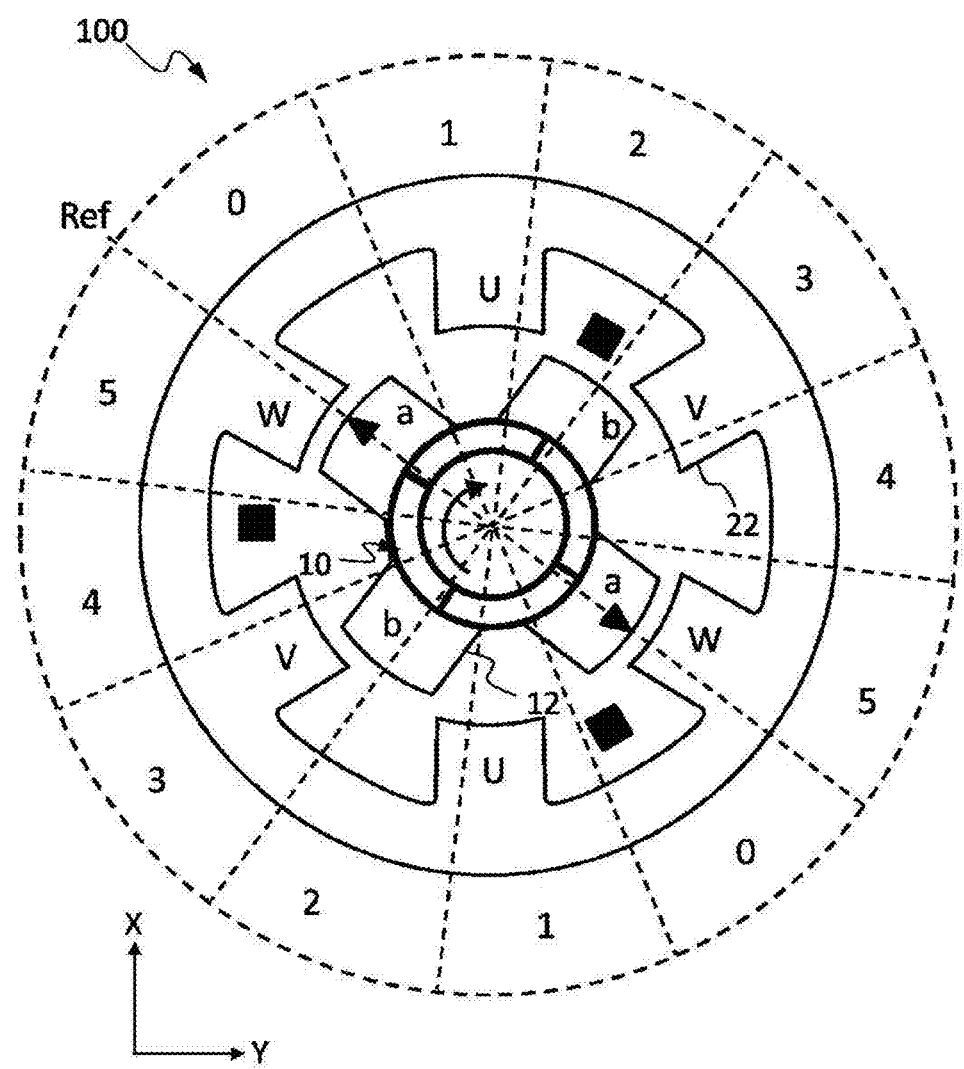
FIG. 6 is a schematic view illustrating the state where 360 degrees in the electrical angle is divided into six angular zones 0 to 5.

Referring to FIG. 6, in the present disclosure, as illustrated in FIG. 6, 360 degrees in the electrical angle is divided into six angular zones 0 to 5. Then, according to the angular zone where the rotor position is located, the excitation of the U, V, and W-phase salient poles is switched. A period during which each of the U, V, W-phase salient poles is excited at the normal rotation corresponds to a period during which the rotor 10 rotates by 120 degrees in the electrical angle. As described later, a period during which each of the U, V, W-phase salient poles is excited corresponds to a period during which the rotor 10 rotates by 180 degrees in the electrical angle.

Figure 7:
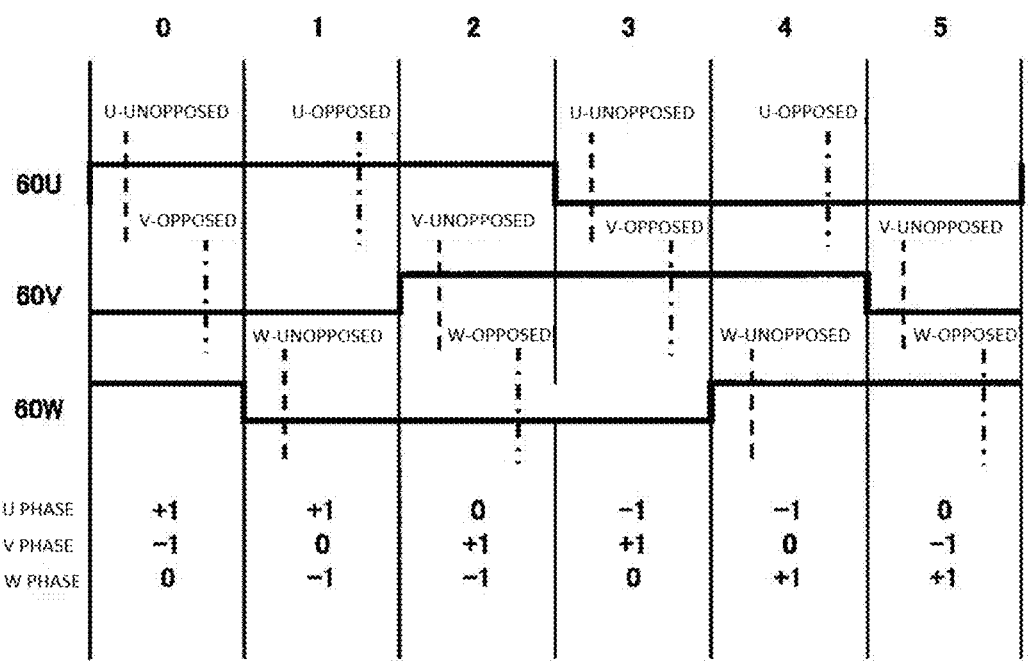
FIG. 7 is the view illustrating the relation (excitation pattern) between a rotor position at normal rotation and an excitation state in an example embodiment of the present disclosure.

First, referring to FIG. 7, the operation at normal rotation is described. FIG. 7 is the view illustrating the relation (excitation pattern) between the rotor position at normal rotation and the excitation state of the stator salient poles in the present example embodiment. FIG. 7 illustrates, for each of the six angular zones 0 to 5, the output signal level of the three magnetic sensors (Hall ICs) 60U, 60V, and 60W, and the excitation state of the U-phase salient pole, the V-phase salient pole, and the W-phase salient pole. The width of one angular zone is 60 degrees in the electrical angle.

In FIG. 7, the output signal levels of the three magnetic sensors 60U, 60V, and 60W each are represented by a thick solid line. These output signal levels cyclically change between Low and High at the timing when the rotor shifts by 180 degrees in the electrical angle.

In FIG. 7, the excitation state of the U-phase salient pole, the V-phase salient pole, and the W-phase salient pole is identified in association with signs "+1", "−1", and "0". "+1" and "−1" each mean that "a current passes through a coil in a first direction" and "a current passes through a coil in a second direction that is opposite to the first direction". The sign "0" means that "no current passes". As described above, the direction of the magnetic flux formed in the stator salient pole 22 depends on the orientation of the current passing through the coil 30. However, magnitude and orientation of the torque are not related to the orientation of the current passing through the coil 30. Accordingly, in the present disclosure, the orientation of the current passing through the coil 30 is arbitrary. The signs "+1" and "−1" illustrated in FIG. 7 may be inverted to the signs "−1" and "+1", respectively, and all signs "−1" may be replaced with the signs "+1". However, as described later, passing the current illustrated in FIG. 7 through the coil advantageously enables an inexpensive general-purpose inverter including a full-bridge circuit to be adopted.

How the positional relation between the rotor 10 and the stator 20 is changed by changing the excitation state of the U-phase salient pole, the V-phase salient pole, and the W-phase salient pole at the timing illustrated in FIG. 7 will be described below.

Figure 8A:
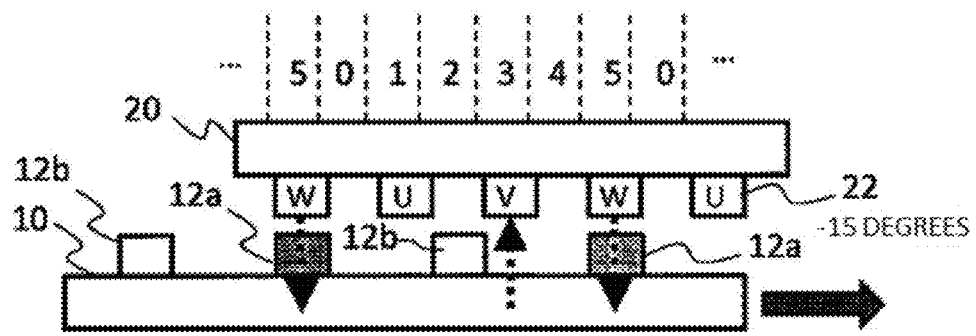
FIG. 8A is a view illustrating the relation between the rotor position at the normal rotation and the excitation state in an example embodiment of the present disclosure.

First, referring to FIG. 8A, FIG. 8A schematically illustrates the excitation state at the rotor position of −15 degrees (angular zone 5). The rotor position of the present disclosure is defined as the central position of the rotor salient pole 12a in the circumferential direction. In FIGS. 5 and 6, the central position of the rotor salient pole 12a in the circumferential direction is represented by the black triangle. In the state illustrated in FIG. 8A, a current "−1" passes through the coil around the V-phase salient pole, and a current "+1" passes through the coil around the W-phase salient pole. Thus, FIG. 8A illustrates an upward arrow through the V-phase salient pole and a downward arrow through the W-phase salient pole. Each of these arrows schematically represents the orientation of the magnetic flux generated by the excited stator salient pole 22 in the salient pole. At the position illustrated in FIG. 8A, the rotor salient pole 12b near the V-phase salient pole is attracted to the V-phase salient pole to give a torque to the rotor 10. The rotor salient poles 12a near the W-phase salient pole is attracted to the W-phase salient pole. However, a force received by the rotor salient pole 12a is oriented to the radial outer side of the rotor 10 to give no torque to the rotor 10.

Figure 8B:
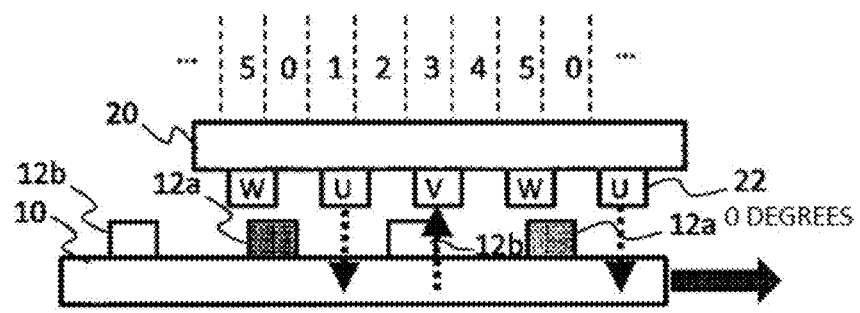
FIG. 8B is another view illustrating the relation between the rotor position at the normal rotation and the excitation state in an example embodiment of the present disclosure.

Next, referring to FIG. 8B, FIG. 8B schematically illustrates the excitation state at the rotor position of 0 degrees (the boundary between the angular zone 5 and the angular zone 0). The rotor position in this case is equal to the rotational position of the rotor 0 as illustrated in FIGS. 5 and 6. At this time, the magnetic sensor 60U detects the boundary between the S pole and the N pole in the sensor magnet 50, and the output signal level changes from Low to High. As a result, a current "−1" remains to pass through the coil around the V-phase salient pole, but a current passing through the coil around the W-phase salient pole stops. Instead, a current "+1" start to pass through the coil around the U-phase salient pole. Thus, FIG. 8B illustrates an upward arrow through the V-phase salient pole and a downward arrow through the U-phase salient pole. At the position illustrated in FIG. 8B, the rotor salient pole 12b near the V-phase salient pole is attracted to the V-phase salient pole to give a torque to the rotor 10.

Figure 8C:
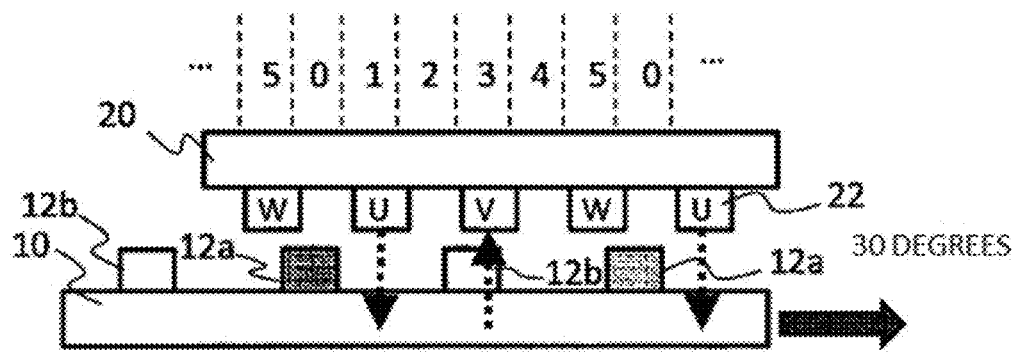
FIG. 8C is still another view illustrating the relation between the rotor position at the normal rotation and the excitation state in an example embodiment of the present disclosure.

Next, referring to FIG. 8C, FIG. 8C schematically illustrates the excitation state at the rotor position of 30 degrees (angular zone 0). A current "−1" passes through the coil around the V-phase salient pole, and a current "+1" passes through the coil around the U-phase salient pole. Thus, FIG. 8C illustrates an upward arrow through the V-phase salient pole and a downward arrow through the U-phase salient pole. At the position illustrated in FIG. 8C, the rotor salient poles 12b near the V-phase salient pole is attracted to the V-phase salient pole to give a torque to the rotor 10. The rotor salient poles 12a near the U-phase salient pole also starts to be attracted to the U-phase salient pole.

Figure 8D:
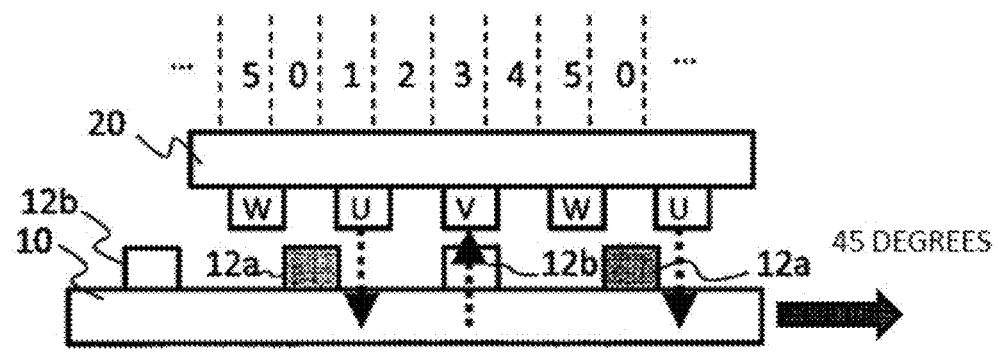
FIG. 8D is still another view illustrating the relation between the rotor position at the normal rotation and the excitation state in an example embodiment of the present disclosure.

Next, referring to FIG. 8D, FIG. 8D schematically illustrates the excitation state at the rotor position of 45 degrees (angular zone 0). A current "−1" remains to pass through the coil around the V-phase salient pole, and a current "+1" remains to pass through the coil around the U-phase salient pole. At the position illustrated in FIG. 8D, even when the rotor salient poles 12b near the V-phase salient pole is attracted to the V-phase salient pole, a torque is not given to the rotor 10. On the contrary, the rotor salient poles 12a near the U-phase salient pole is attracted to the U-phase salient pole to give a torque to the rotor 10.

Here, referring to FIG. 7 again, in the angular zone 0 illustrated in FIG. 7, terms "U-unopposed" and "V-opposed" are described. The "U-unopposed" means that the U-phase salient pole is not opposed to the rotor salient pole. In other words, in the "U-unopposed", the U-phase salient pole is opposed to an intermediate portion of the two adjacent rotor salient poles 12. In this example, when the rotor position is 15 degrees, "U-unopposed" is generated. The "V-opposed" means that the V-phase salient pole is opposed to the rotor salient pole. In this example, as illustrated in FIG. 8D, when the rotor position is 45 degrees, the "V-opposed" is generated. For example, terms "V-unopposed" and "U-opposed" are also described in other angular zones 1 to 5 illustrated in FIG. 7, and have similar meanings.

Figure 8E:
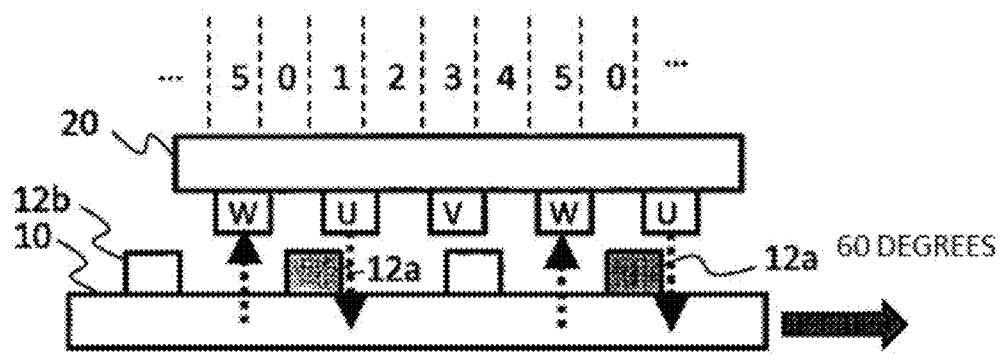
FIG. 8E is still another view illustrating the relation between the rotor position at the normal rotation and the excitation state in an example embodiment of the present disclosure.

Next, referring to FIG. 8E, FIG. 8E schematically illustrates the excitation state at the rotor position of 60 degrees (the boundary between the angular zone 0 and the angular zone 1). A current "+1" remains to pass through the coil around the U-phase salient pole. However, a current passing through the coil around the V-phase salient pole stops. Then, a current "−1" starts to pass through the coil around the W-phase salient pole. At the position illustrated in FIG. 8E, the rotor salient pole 12a near the U-phase salient pole is attracted to the U-phase salient pole to give a torque to the rotor 10.

Figure 8F:
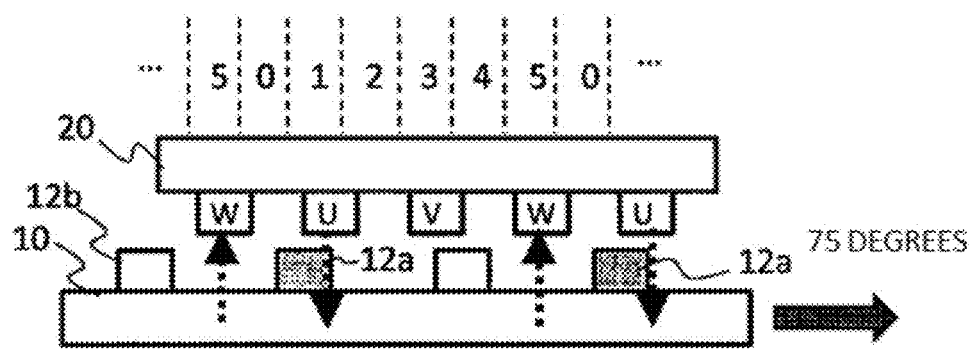
FIG. 8F is still another view illustrating the relation between the rotor position at the normal rotation and the excitation state in an example embodiment of the present disclosure.

Next, referring to FIG. 8F, FIG. 8F schematically illustrates the excitation state at the rotor position of 75 degrees (angular zone 1). Currents passing through the coil around the U-phase salient pole and the coil around the W-phase salient pole are the same as those in FIG. 8E. At the position illustrated in FIG. 8F, the W-phase salient pole is opposed to an intermediate position of the two adjacent rotor salient poles (W-unopposed). The rotor salient poles 12a near the U-phase salient pole is attracted to the U-phase salient pole to give a torque to the rotor 10.

Figure 8G:
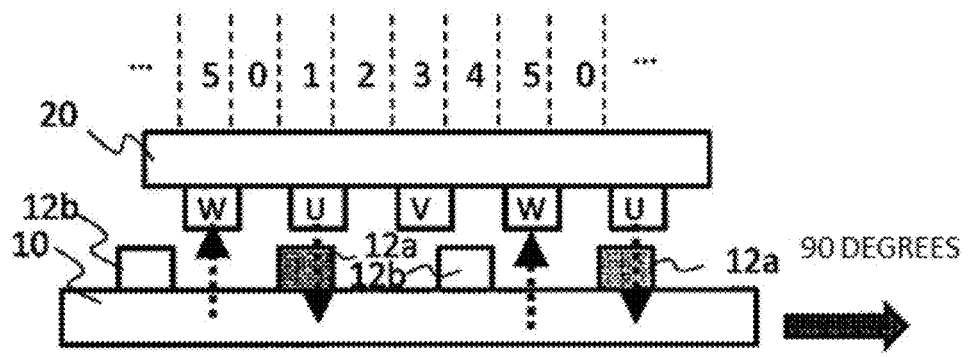
FIG. 8G is still another view illustrating the relation between the rotor position at the normal rotation and the excitation state in an example embodiment of the present disclosure.

Next, referring to FIG. 8G, FIG. 8G schematically illustrates the excitation state at the rotor position of 90 degrees (angular zone 1). Currents passing through the coil around the U-phase salient pole and the coil around the W-phase salient pole are the same as those in the excitation state illustrated in FIG. 8F. The rotor salient poles 12a near the U-phase salient pole is attracted to the U-phase salient pole, and the rotor salient poles 12b near the W-phase salient pole is attracted to the W-phase salient pole to give a torque to the rotor 10.

Figure 8H:
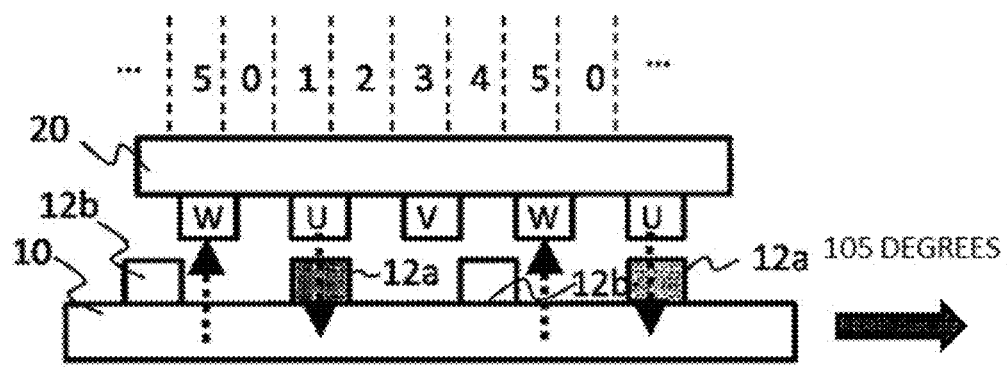
FIG. 8H is still another view illustrating the relation between the rotor position at the normal rotation and the excitation state in an example embodiment of the present disclosure.
Figure 8I:
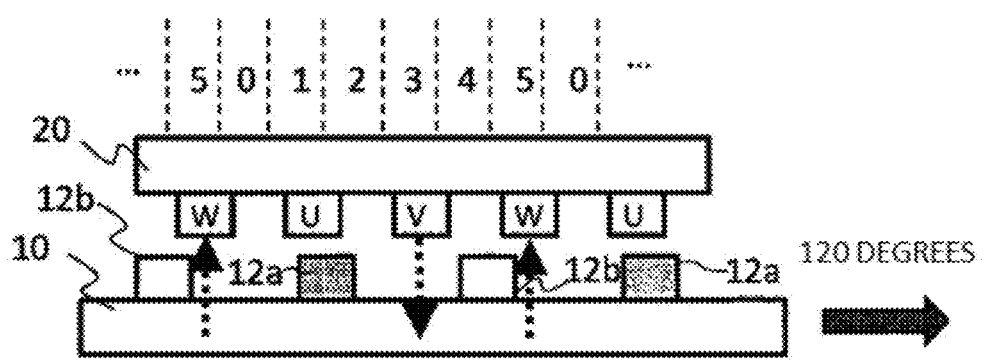
FIG. 8I is still another view illustrating the relation between the rotor position at the normal rotation and the excitation state in an example embodiment of the present disclosure.

Next, referring to FIG. 8H, FIG. 8H schematically illustrates the excitation state at the rotor position of 105 degrees (angular zone 1). Currents passing through the coil around the U-phase salient pole and the coil around the W-phase salient pole are the same as those in the excitation state illustrated in FIG. 8G. However, since the U-phase salient pole is opposed to the rotor salient pole 12a, a torque is not given to the rotor salient poles 12a. The rotor salient poles 12b near the W-phase salient pole is attracted to the W-phase salient pole to give a torque to the rotor 10.

Finally, referring to FIG. B1, FIG. B1 schematically illustrates the excitation state at the rotor position of 120 degrees (the boundary between the angular zone 1 and the angular zone 2). A current passing through the coil around the U-phase salient pole stops and instead, a current "+1" starts to pass through the coil around the V-phase salient pole. A current passing through the coil around the W-phase salient pole does not change. The rotor salient poles 12b near the W-phase salient pole is attracted to the W-phase salient pole to give a torque to the rotor 10.

The rotor position illustrated in FIG. B1 may be detected based on the second magnetic sensor 60V in FIG. 5 being opposed to the boundary position between the S pole and the N pole in the sensor magnet 50.

As described above, the period during which the current passes through the coil around the U-phase salient pole to excite the U-phase salient pole is the period during which the rotor position becomes 0 degrees to 120 degrees. In other words, the rotor position (reference position Ref) where the current starts to pass through the coil around the U-phase salient pole is the position reversely rotated from the position where the U-phase salient pole is opposed to any of the plurality of rotor salient poles 12 by 105 degrees in the electrical angle. The boundary position between the S pole and the N pole in the sensor magnet 50 attached to the shaft 40 is determined such that the first magnetic sensor 60U may detect that the rotor position has reached the reference position Ref. Specifically, when the circumferential center of at least one rotor salient pole 12 among the plurality of rotor salient poles 12 aligns with the circumferential center of the U-phase salient pole, the boundary position between the S pole and the N pole in the sensor magnet 50 is assumed to be about 15 degrees in the electrical angle (7.5 degrees in the mechanical angle) reversely rotated from the position opposed to the second magnetic sensor 60V in the circumferential direction of the shaft 40. Desirably, the boundary position between the S pole and the N pole in the sensor magnet 50 falls within the range from 10 to degrees in the electrical angle (5 to 10 degrees in the mechanical angle) reversely rotated from the position opposed to the second magnetic sensor 60V in the circumferential direction of the shaft 40. The range from 10 to 20 degrees in the electrical angle assumes ±5 degrees in the electrical angle as a mounting error.

Referring to FIGS. 8A to 8I, the movement of the rotor 10 in the period (120 degrees in the electrical angle) during which the U-phase salient pole is excited has been mainly described. The periods during which V and W-phase stator salient poles are excited may be recognized in the similar manner. The driving mode of exciting each of the U-phase, V-phase, and W-phase salient poles by 120 degrees in the electrical angle may be referred to as "120-degree conduction". The excitation pattern at the normal rotation as illustrated in FIG. 7 achieves driving by 45 degrees in an advanced angle. In the present example embodiment, 360 degrees in the electrical angle is divided into the six angular zone, and the excitation state is switched in six steps (6-step driving). Since the excitation state is switched in six steps according to the rotor position, even when the rotor position is located in any of the angular zones, a torque to normally rotate the rotor 10 is generated at all times.

Figure 9:
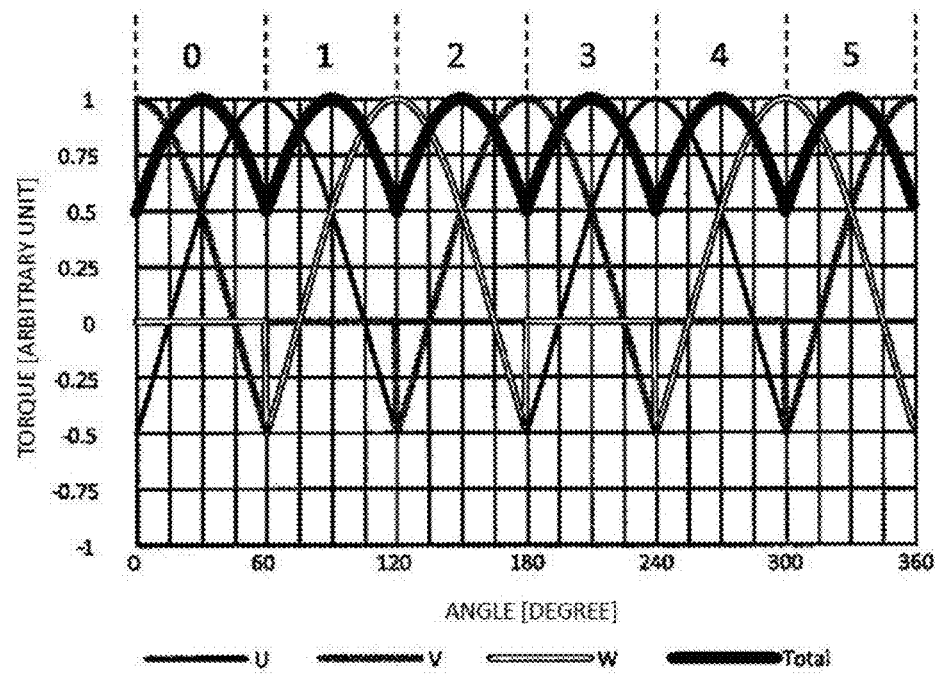
FIG. 9 is a graph illustrating the relation between the magnitude of the torque generated in the rotor 10 at the normal rotation and the rotor position in an example embodiment of the present disclosure.

FIG. 9 is a graph illustrating the relation between the magnitude of the torque generated in the rotor 10 and the rotor position in the present example embodiment. The magnitude of the torque was calculated. The graph in FIG. 9 illustrates a curve indicating the torque generated by the U-phase salient pole, a curve indicating the torque generated by the V-phase salient pole, a curve indicating the torque generated by the W-phase salient pole, and a curve indicating the total torque.

Figure 10A:
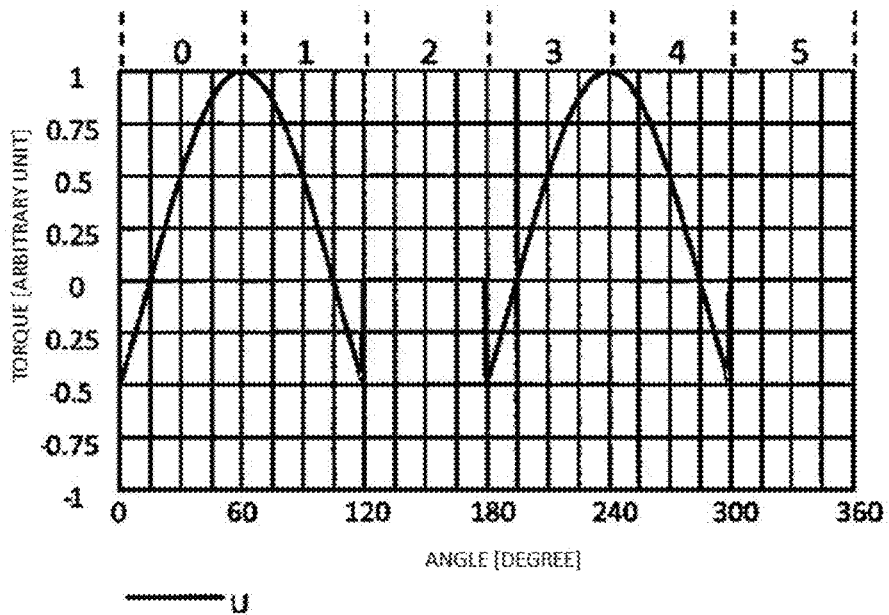
FIG. 10A is a graph illustrating a curve indicating the torque generated by the U-phase salient pole at the normal rotation.
Figure 10B:
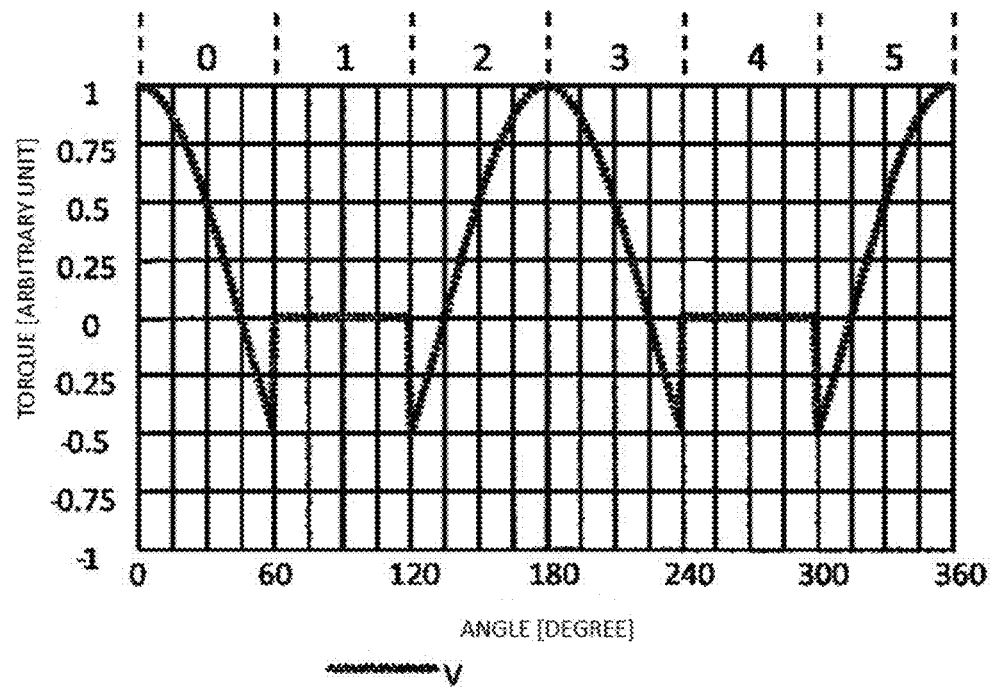
FIG. 10B is a graph illustrating a curve indicating the torque generated by the V-phase salient pole at the normal rotation.
Figure 10C:
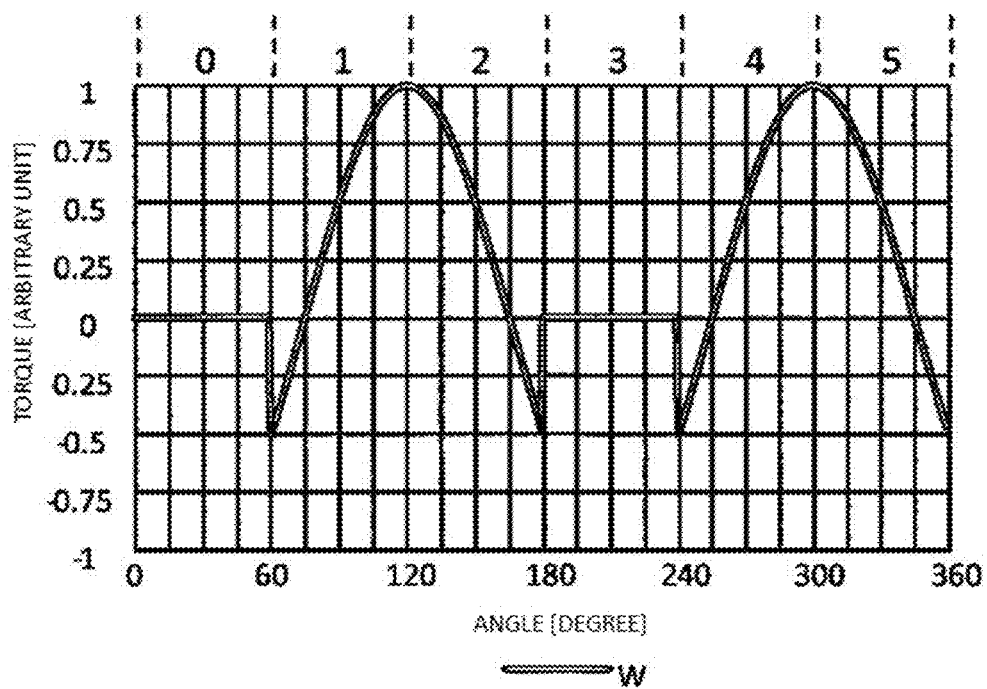
FIG. 10C is a graph illustrating a curve indicating the torque generated by the W-phase salient pole at the normal rotation.

FIGS. 10A, 10B, and 10C are a graph illustrating a curve indicating the torque generated by the U-phase salient pole, a graph illustrating a curve indicating the torque generated by the V-phase salient pole, and a graph illustrating a curve indicating the torque generated by the W-phase salient pole, respectively. As apparent to these drawings, according to the rotor position, the torque generated by one of the excited 2-phase stator salient poles may be negative. For example, when the rotor position falls within the range from 0 to 15 degrees, the torque generated by the U-phase salient pole is negative as illustrated in FIG. 10A, while the torque generated by the V-phase salient pole has a sufficiently large positive value as illustrated in FIG. 10B. When the rotor position falls within the range from 45 to 60 degrees, the torque generated by the V-phase salient pole is negative as illustrated in FIG. 10B, while the torque generated by the U-phase salient pole has a sufficiently large value as illustrated in FIG. 10A. As described above, even when part of the torque generated by the U-phase salient pole, the V-phase salient pole, and the W-phase salient pole is negative, the total torque is positive at all times as illustrated in FIG. 9. Accordingly, wherever the rotor 10 is stopped before rotation in any of locations, by detecting the angular zone, in which the rotor position is located, among the six angular zones 0 to 6, the rotor 10 may be started in the normal rotation. Since the angular resolution to detect the rotor position is 60 degrees in the electrical angle, an expensive angular sensor such as a resolver or rotary encoder having higher resolution is unnecessary.

The excitation pattern illustrated in FIG. 7 is performed at the start of rotation of the SR motor 100 in the normal rotational direction. After the start of rotation of the rotor 10, driving for achieving another excitation pattern may be performed in accordance with the rotational speed of the rotor 10. For example, at timing shifted from the time when the level of the output signal of the first magnetic sensor 60U changes from Low to High by predetermined dimension, excitation of the U-phase salient pole may be started. The period during a current passes through each of the coils 30 around the U-phase salient pole, the V-phase salient pole, and the W-phase salient pole is not limited to "120-degree conduction", and may be changed in accordance with the rotational speed of the rotor 10 or so on.

Figure 11:
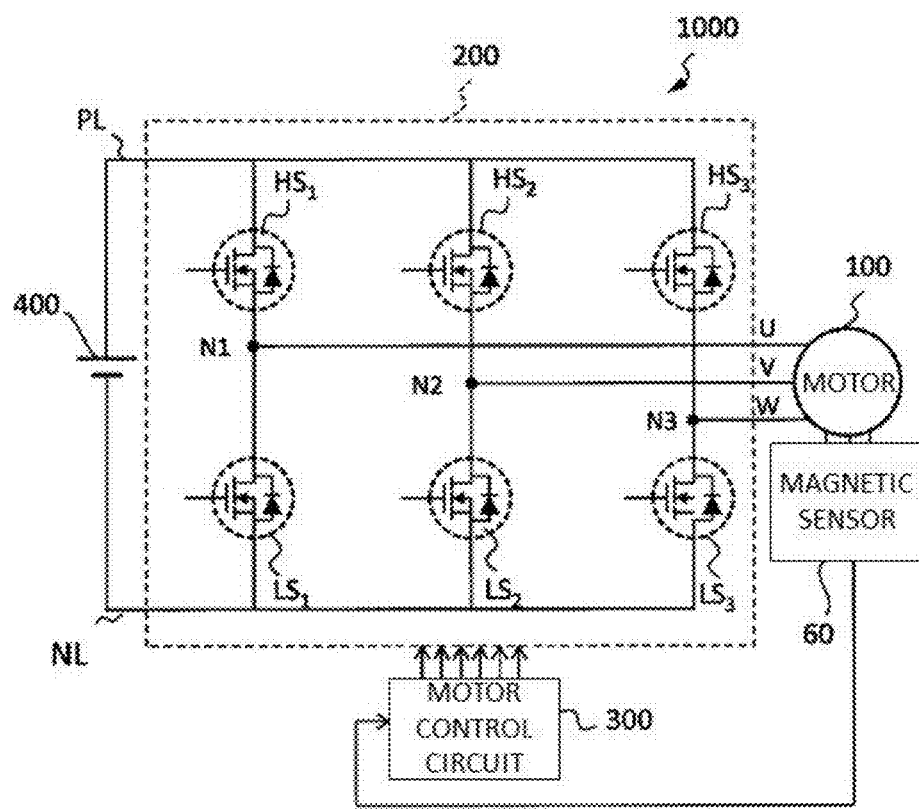
FIG. 11 is a view illustrating the relation (excitation pattern) between the rotor position at reverse rotation and the excitation state in an example embodiment of the present disclosure.

Next, referring to FIG. 11, the operation at reverse direction is described. FIG. 11 is a view illustrating the relation (excitation pattern) between the rotor position at reverse rotation and the excitation state of the stator salient poles in the present example embodiment. FIG. 11 corresponds to FIG. 7, and illustrates, for each of the six angular zones 0 to 5, the output signal level of the three magnetic sensors (Hall ICs) 60U, 60V, and 60W, and the excitation state of the U-phase salient pole, the V-phase salient pole, and the W-phase salient pole. When the excitation pattern illustrated in FIG. 11 is performed, the rotor 10 reversely rotates. For example, when the stopped position of the rotor is located in the angular zone 5, the rotor position moves in the order of the angular zone 5, the angular zone 4, the angular zone 3, . . . .

In FIG. 11, as in FIG. 7, the output signal levels of the three magnetic sensors 60U, 60V, and 60W each are represented by a thick solid line. These output signal levels cyclically changes between Low and High at the timing when the rotor shifts by 180 degrees in the electrical angle.

In FIG. 11, the excitation state of the U-phase salient pole, the V-phase salient pole, and the W-phase salient pole is identified in association with signs "+1", "+0.5", "0", "−0.5", and "−1". "+1" and "+0.5" each mean that "a current having first dimension passes through a coil in a first direction" and "a current having second dimension that is a half of the first dimension passes through a coil in the first direction", respectively. The signs "−1" and "−0.5" each mean that "a current having the first dimension passes through a coil in a second direction that is opposite to the first direction" and "a current having second dimension that is a half of the first dimension passes through a coil in the second direction", respectively. The sign "0" means that "no current passes". In the example illustrated in FIG. 11, the U-phase salient pole, the V-phase salient pole, and the W-phase salient pole are excited more or less at all times.

As described above, the direction of the magnetic flux formed in the stator salient pole 22 depends on the orientation of the current passing through the coil 30, but magnitude and orientation of the torque does not relate to the orientation of the current passing through the coil 30. Accordingly, in the present disclosure, the orientation of the current passing through the coil 30 is arbitrary. Some or all of the signs "+" and "−" illustrated in FIG. 11 may be inverted. As described with reference to FIG. 7, passing the current illustrated in FIG. 11 through the coil advantageously enables an inexpensive general-purpose inverter including a full-bridge circuit to be adopted.

How the positional relation between the rotor 10 and the stator 20 is changed by changing the excitation state of the U-phase salient pole, the V-phase salient pole, and the W-phase salient pole at the timing illustrated in FIG. 11 will be described below.

Figure 12A:
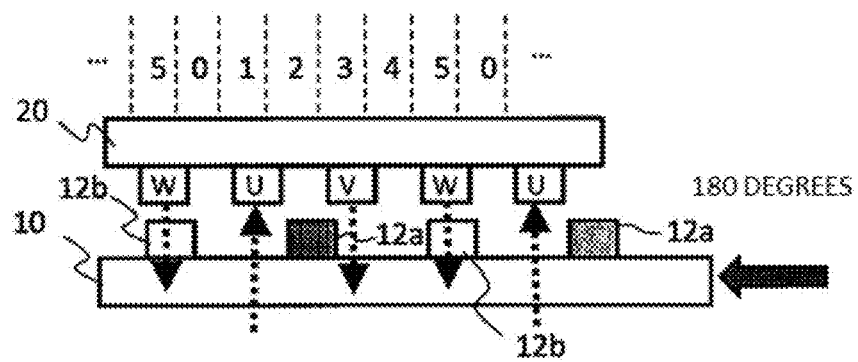
FIG. 12A is a view illustrating the relation between the rotor position at reverse rotation and the excitation state in an example embodiment of the present disclosure.

First, referring to FIG. 12A, FIG. 12A schematically illustrates the excitation state at the rotor position of 180 degrees (the boundary between the angular zone 2 and the angular zone 3). Describing more strictly, FIG. 12A schematically illustrates the state in which the rotor position moves from the angular zone 3 to the angular zone 2 and the excitation state is switched to the excitation state in the angular zone 2. At this time, magnetic sensor 60U detects the boundary between the S pole and the N pole of the sensor magnet 50, and the output signal level changes from Low to High. In the state illustrated in FIG. 12A, a current of "−1" passes through the coil around the U-phase salient pole, a current of "+0.5" passes through the coil around the V-phase salient pole, and a current of "+0.5" passes through the coil around the W-phase salient pole. Thus, FIG. 12A illustrates an upward arrow through the U-phase salient pole and downward arrows through the V-phase salient pole and the W-phase salient pole. These arrows schematically each illustrate the orientation of the magnetic flux generated in the excited stator salient pole 22. A relatively long arrow indicates that a current of "+1" or "−1" passes, and a relatively short arrow indicates that a current of "+0.5" or "−0.5" passes.

At the position illustrated in FIG. 12A, the rotor salient pole 12a near the U-phase salient pole through which a large current passes is attracted to the U-phase salient pole, to apply a torque (negative) in the reverse rotational direction (leftward in the figure) to the rotor 10. The V-phase salient pole applies a torque (positive) in the normal rotational direction to the rotor 10, while the W-phase salient pole applies a torque in the reverse rotational direction (negative) to the rotor 10. A total value of the torques becomes negative, generating a torque in the reverse rotational direction as a whole.

Figure 12B:
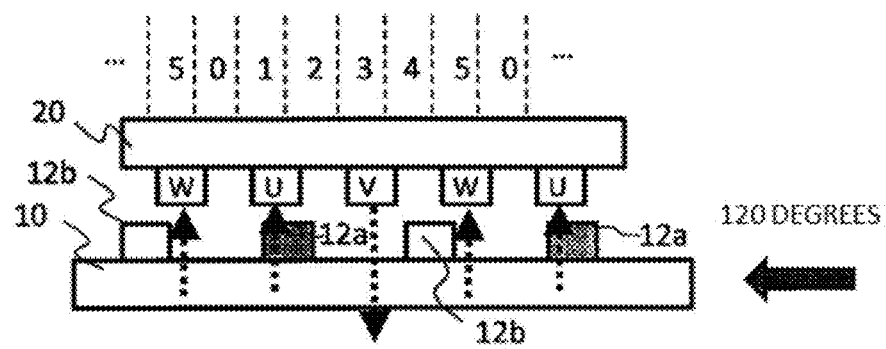
FIG. 12B is another view illustrating the relation between the rotor position at reverse rotation and the excitation state in an example embodiment of the present disclosure.

Next, referring to FIG. 12B, FIG. 12B schematically illustrates the excitation state at the rotor position of 120 degrees (the boundary between the angular zone 2 and the angular zone 1). Describing more correctly, FIG. 12B schematically illustrates the state in which the rotor position moves from the angular zone 2 to the angular zone 1 and the excitation state is switched to the excitation state in the angular zone 1. At this time, magnetic sensor 60V detects the boundary between the S pole and the N pole of the sensor magnet 50, and the output signal level changes from High to Low. As a result, currents of "−0.5", "+1", and "−0.5" pass through the coils around the U-phase salient pole, the V-phase salient pole, and the W-phase salient pole, respectively. Thus, FIG. 12B illustrate upward arrows through the U-phase salient pole and the W-phase salient pole, and a downward arrow through the V-phase salient pole. At the position illustrated in FIG. 12B, the rotor salient pole 12b near the V-phase salient pole is attracted to the V-phase salient pole, to apply a torque in the reverse rotational direction to the rotor 10. The W-phase salient pole applies a torque in the normal rotational direction to the rotor 10, and U-phase salient pole applies a torque in the reverse rotational direction to the rotor 10. A total value of the torques becomes negative, generating a torque in the reverse rotational direction as a whole.

Figure 12C:
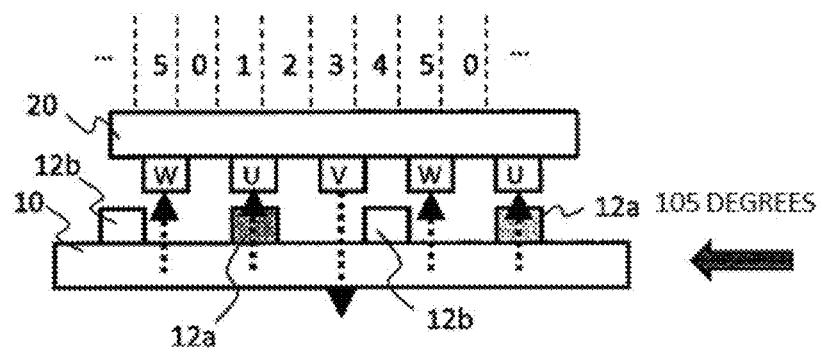
FIG. 12C is still another view illustrating the relation between the rotor position at reverse rotation and the excitation state in an example embodiment of the present disclosure.

Next, referring to FIG. 12C, FIG. 12C schematically illustrates the excitation state at the rotor position of 105 degrees (angular zone 1, U-opposed). The excitation state remains unchanged from the state illustrated in FIG. 12B. However, since the U-phase salient pole is opposed to the salient pole 12a in the rotor 10, the U-phase salient pole does not apply a torque to the rotor 10. The rotor salient pole 12b near the V-phase salient pole is attracted to the V-phase salient pole, to apply a torque in the reverse rotational direction to the rotor 10. The W-phase salient pole applies a torque in the normal rotational direction to the rotor 10. However, also at the position illustrated in FIG. 12C, a total value of the torques becomes negative, generating a torque in the reverse rotational direction as a whole.

Figure 12D:
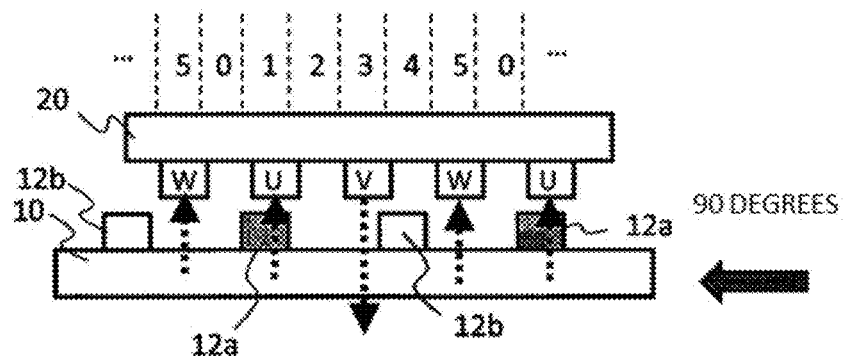
FIG. 12D is still another view illustrating the relation between the rotor position at reverse rotation and the excitation state in an example embodiment of the present disclosure.

Next, referring to FIG. 12D, FIG. 12D schematically illustrates the excitation state at the rotor position of 90 degrees (the angular zone 1). The excitation state remains unchanged from the state illustrated in FIGS. 12B and 12C. Both of the U-phase salient pole and the W-phase salient pole applies a torque in the normal rotational direction to the rotor 10, but the torque is small. The rotor salient pole 12b near the V-phase salient pole through which a relatively large current passes is attracted to the V-phase salient pole, to apply a torque in the reverse rotational direction to the rotor 10. A total value of the torques becomes negative, generating a torque in the reverse rotational direction as a whole.

Figure 12E:
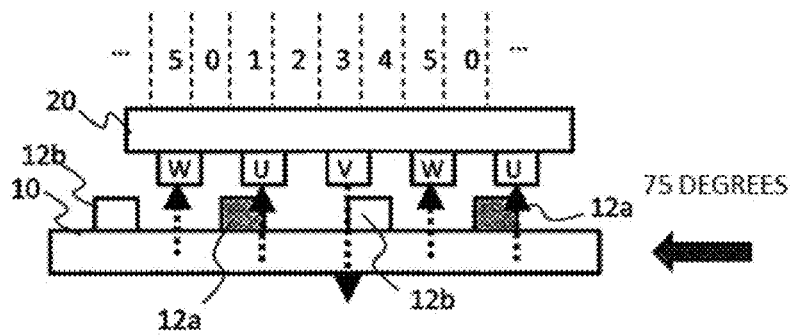
FIG. 12E is still another view illustrating the relation between the rotor position at reverse rotation and the excitation state in an example embodiment of the present disclosure.

Next, referring to FIG. 12E, FIG. 12E schematically illustrates the excitation state at the rotor position of 75 degrees (the angular zone 1, W-unopposed). The excitation state remains unchanged from the state illustrated in FIG. 12D, but the W-phase salient pole is opposed to the intermediate position between the two adjacent rotor salient poles (W-unopposed). Thus, the W-phase salient pole does not generate a torque. The rotor salient pole 12a near the U-phase salient pole is attracted to the U-phase salient pole, to apply a torque in the normal rotational direction to the rotor 10. The rotor salient pole 12a near the V-phase salient pole is attracted to the V-phase salient pole, and an absolute value of a resultant torque in the reverse rotational direction is relatively large. A total value of the torques becomes negative, generating a torque in the reverse rotational direction.

Figure 12F:
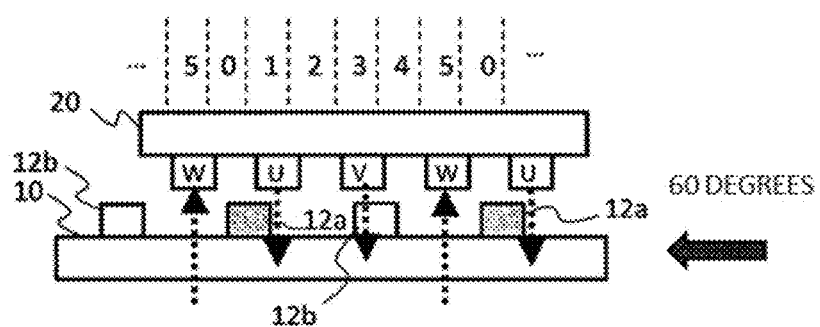
FIG. 12F is still another view illustrating the relation between the rotor position at reverse rotation and the excitation state in an example embodiment of the present disclosure.

Next, referring to FIG. 12F, FIG. 12F schematically illustrates the excitation state at the rotor position of 60 degrees (the boundary between the angular zone 1 and the angular zone 0). Describing more strictly, FIG. 12F schematically illustrates the state in which the rotor position moves from the angular zone 1 to the angular zone 0 and the excitation state is switched to the excitation state in the angular zone 0. At this time, the magnetic sensor 60W detects the boundary between the S pole and the N pole of the sensor magnet 50, and the output signal level changes from Low to High. As a result, currents of "+0.5", "+0.5", and "−1" pass through the coils around the U-phase salient pole, the V-phase salient pole, and the W-phase salient pole, respectively. Thus, FIG. 12F illustrates an upward arrow through the W-phase salient pole, and downward arrows through the U-phase salient pole and the V-phase salient pole. At the position illustrated in FIG. 12F, the rotor salient pole 12a near the W-phase salient pole is attracted to the W-phase salient pole, to apply a torque in the reverse rotational direction to the rotor 10. The U-phase salient pole applies a torque in the normal rotational direction to the rotor 10, while the V-phase salient pole applies a torque in the reverse rotational direction to the rotor 10. A total value of the torques becomes negative, generating a torque in the reverse rotational direction as a whole.

Figure 12G:
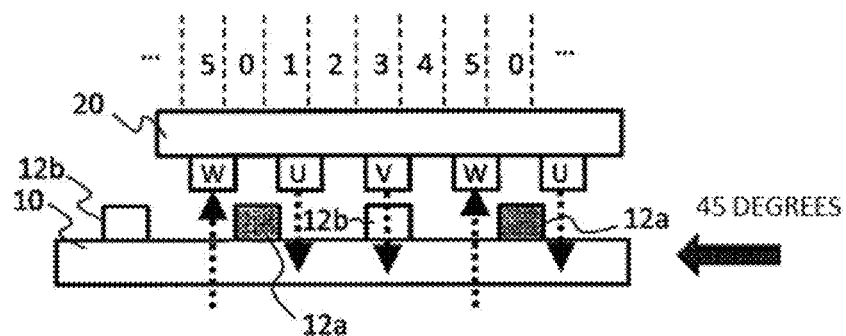
FIG. 12G is still another view illustrating the relation between the rotor position at reverse rotation and the excitation state in an example embodiment of the present disclosure.

Next, referring to FIG. 12G, FIG. 12G schematically illustrates the excitation state at the rotor position of 45 degrees (angular zone 0). The excitation state remains unchanged from the state illustrated in FIG. 12F. However, the V-phase salient pole is opposed to the rotor salient pole 12b (V-opposed). Since the V-phase salient pole is opposed to the rotor salient pole 12b, a torque is not applied to the rotor salient pole 12b. The rotor salient pole 12a near the W-phase salient pole is attracted to the W-phase salient pole, to apply a torque in the reverse rotational direction to the rotor 10. The U-phase salient pole applies a torque in the normal rotational direction to the rotor 10. However, also at the illustrated in FIG. 12G, a total value of the torques becomes negative, generating a torque in the reverse rotational direction as a whole.

Figure 12H:
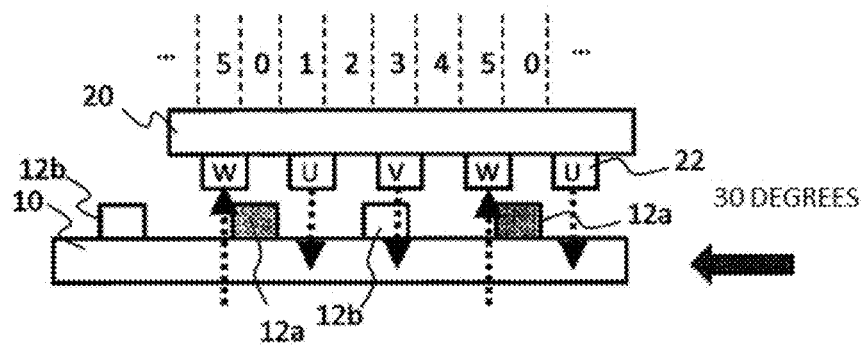
FIG. 12H is still another view illustrating the relation between the rotor position at reverse rotation and the excitation state in an example embodiment of the present disclosure.

Next, referring to FIG. 12H, FIG. 12H schematically illustrates the excitation state at the rotor position of 30 degrees (angular zone 0). The excitation state remains unchanged from the state illustrated in FIG. 12G. The U-phase salient pole and the V-phase salient pole apply a torque in the normal rotational direction to the rotor 10, but the torque is small. The rotor salient pole 12a near the W-phase salient pole is attracted to the W-phase salient pole, to apply a torque in the reverse rotational direction to the rotor 10. A total value of the torques becomes negative, generating a torque in the reverse rotational direction as a whole.

Figure 12I:
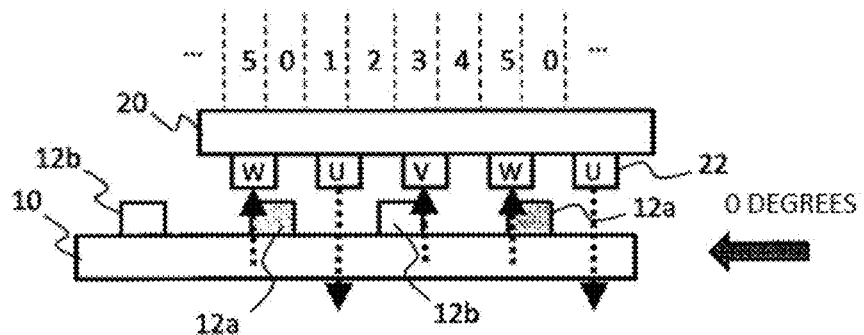
FIG. 12I is still another view illustrating the relation between the rotor position at reverse rotation and the excitation state in an example embodiment of the present disclosure.

Finally, referring to FIG. 12I, FIG. 12I schematically illustrates the excitation state at the rotor position of 0 degrees (the boundary between the angular zone 0 and the angular zone 5). Describing more strictly, FIG. 12I schematically illustrates the state in which the rotor position moves from the angular zone 0 to the angular zone 5 and the excitation state is switched to the excitation state in the angular zone 5. At this time, magnetic sensor 60U detects the boundary between the S pole and the N pole of the sensor magnet 50, and the output signal level changes from High to Low. As a result, currents of "+1", "−0.5", and "−0.5" pass through the coils around the U-phase salient pole, the V-phase salient pole, and the W-phase salient pole, respectively. Thus, FIG. 12I illustrates upward arrows through the V-phase salient pole and the W-phase salient pole, and a downward arrow through the U-phase salient pole. At the position FIG. 12F, the rotor salient pole 12b near the U-phase salient pole is attracted to the U-phase salient pole, to apply a torque in the reverse rotational direction to the rotor 10. Also in this state, a total value of the torques becomes negative, generating a torque in the reverse rotational direction as a whole.

Even when the rotor position is located in other angular zones, by performing the excitation pattern illustrated in FIG. 11 in the same manner, a negative torque may be generated at all time to reversely rotate the rotor 10.

The excitation pattern in FIG. 11 is a driving mode of exciting each of the U-phase, V-phase, and W-phase salient poles by 180 degrees in the electrical angle, and may be referred to as "180-degree conduction". Such excitation pattern at reverse rotation achieves driving by 135 degrees in advanced angle. Even when the rotor position is located in any of the six angular zones, a torque (negative) to reversely rotate the rotor 10 is generated at all times.

Figure 13:
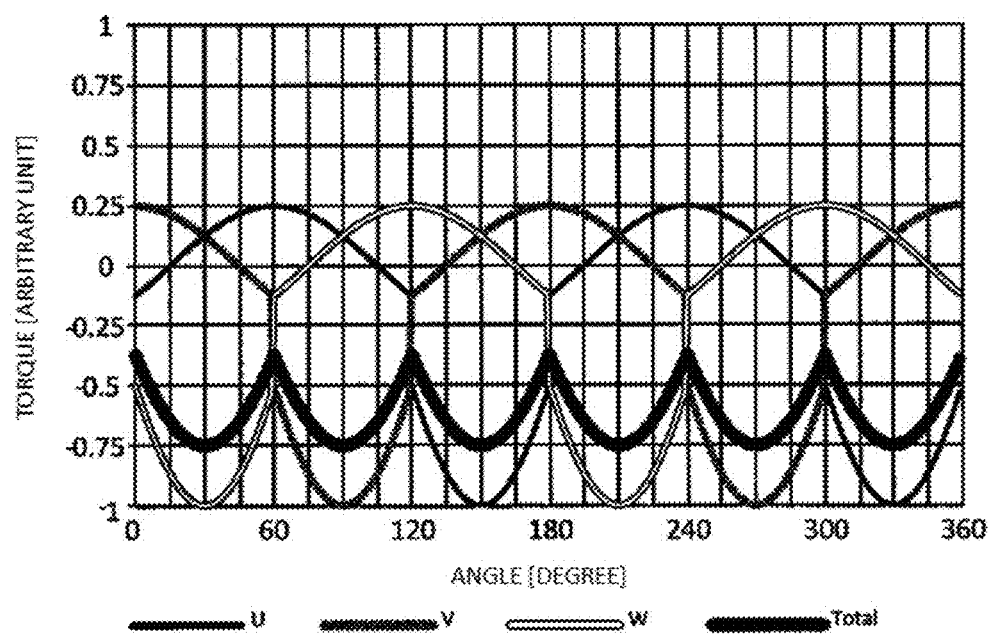
FIG. 13 is a graph illustrating the relation between the magnitude of the torque generated in the rotor 10 at reverse rotation and the rotor position in an example embodiment of the present disclosure.

FIG. 13 is a graph illustrating the relation between the magnitude of the torque generated in the rotor 10 and the rotor position in the present example embodiment. The magnitude of the torque was calculated. The graph in FIG. 13 illustrates a curve indicating the torque generated by the U-phase salient pole, a curve indicating the torque generated by the V-phase salient pole, a curve indicating the torque generated by the W-phase salient pole, and a curve indicating the total torque.

Figure 14A:
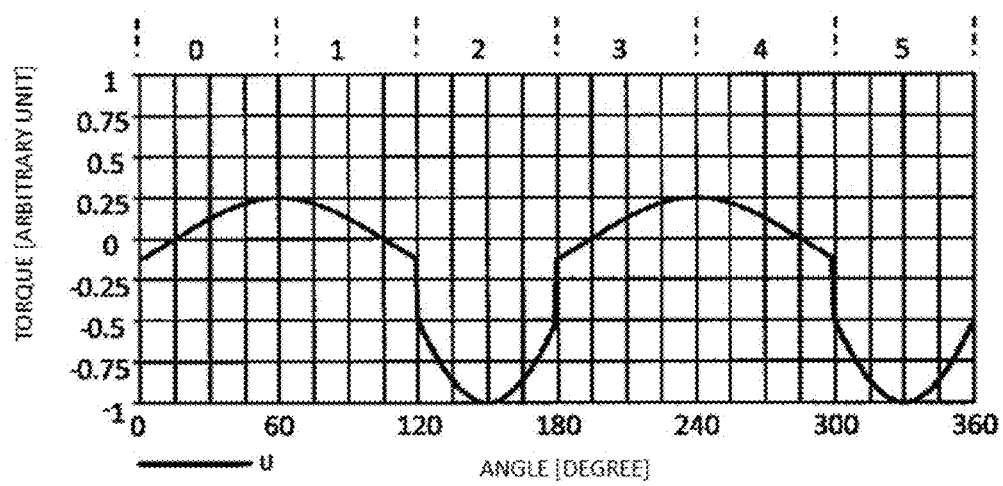
FIG. 14A is a graph illustrating a curve indicating the torque generated by the U-phase salient pole at reverse rotation.
Figure 14B:
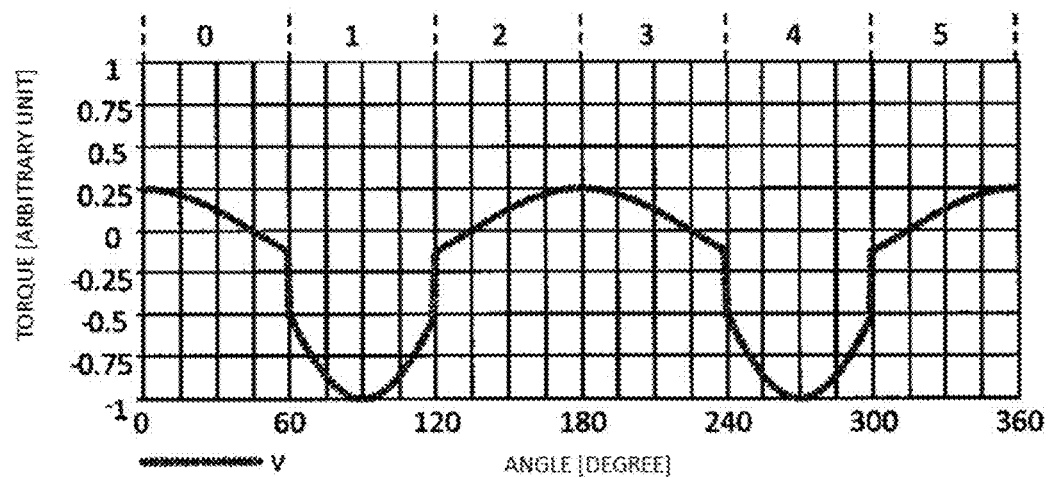
FIG. 14B is a graph illustrating a curve indicating the torque generated by the V-phase salient pole at reverse rotation.
Figure 14C:
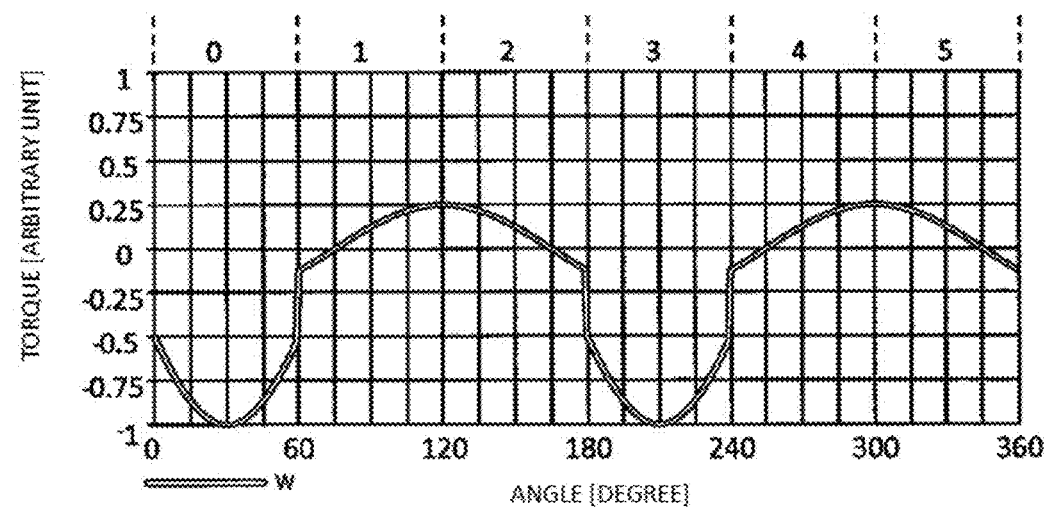
FIG. 14C is a graph illustrating a curve indicating the torque generated by the W-phase salient pole at reverse rotation.

FIGS. 14A, 14B, and 14C are a graph illustrating a curve indicating the torque generated by the U-phase salient pole, a graph illustrating a curve indicating the torque generated by the V-phase salient pole, and a graph illustrating a curve indicating the torque generated by the W-phase salient pole, respectively. As apparent to these drawings, according to the rotor position, the torque generated by one of the excited 3-phase stator salient poles may be positive. However, as illustrated in FIG. 13, the total torque becomes negative at all times. Accordingly, wherever the rotor 10 is stopped before rotation, by detecting which of the six angular zones 0 to 6 the rotor position is located in, the rotor 10 may be started in the reverse rotational direction at all times. As in the case of the normal rotation, since the angular resolution to detect the rotor position is 60 degrees in the electrical angle, an expensive angular sensor such as a resolver or rotary encoder having higher resolution is unnecessary.

The excitation pattern illustrated in FIG. 11 is performed at the start of rotation of the SR motor 100 in the reverse rotational direction. After the start of rotation of the rotor 10, driving for achieving another excitation pattern may be performed in accordance with the rotational speed of the rotor 10. For example, at timing shifted from the time when the level of the output signal of the first magnetic sensor 60U changes from Low to High by predetermined dimension, excitation of the U-phase salient pole may be started. The period during a current passes through each of the coils 30 around the U-phase salient pole, the V-phase salient pole, and the W-phase salient pole is not limited to "180-degree conduction", and may be changed in accordance with the rotational speed of the rotor 10 or so on.

As apparent from FIGS. 9 and 13, an absolute value of the total torque at normal rotation is larger than an absolute value of the total torque at reverse rotation. Thus, when the motor system of the present disclosure is implemented, the normal rotational direction is preferably determined such that the total torque becomes maximum in the direction requiring a larger torque. In the example embodiment of the present disclosure, when viewed from the magnetic sensor side, the clockwise rotational direction of the rotor is defined as "normal rotation". Since "normal rotation" and "reverse rotation" are diametrically opposed to each other, even if the definitions of "normal rotation" and "reverse rotation" are interchanged, the effect of the present disclosure may be apparently acquired. As a result of such interchange, the configuration illustrated in FIG. 1A is horizontally reversed, and counterclockwise rotation in FIG. 1A agrees with "normal rotation".

The reluctance motor included in the motor system of the present disclosure is not limited to the switched reluctance motor in the above-mentioned example embodiment, and may be a synchronous reluctance motor. The structure of the reluctance motor of the present disclosure is not limited to the "6-4 structure", and may be, for example, the "3-2 structure" and the "6-2 structure".

Figure 15:
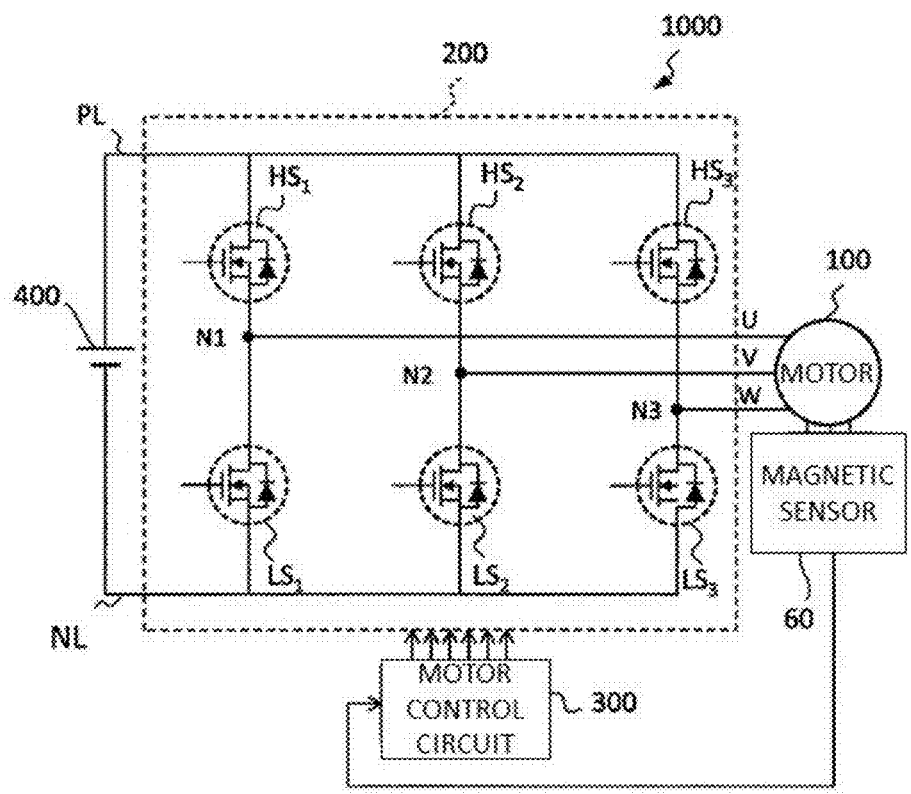
FIG. 15 is a circuit diagram of the motor system according to a non-limiting example embodiment of the present disclosure.

FIG. 15 is a circuit diagram of a motor system according to a non-limiting exemplary example embodiment of the present disclosure.

A motor system 1000 illustrated in FIG. 15 includes the above-mentioned SR motor 100, an inverter circuit 200 electrically connected to the 3-phase (U, V, and W phases) coils of the SR motor 100, and a motor control circuit 300 electrically connected to the inverter circuit 200.

The motor control circuit 300 receives outputs of the magnetic sensors 60, and outputs a drive signal (gate control signal) to change the voltage applied to the 3-phase coils while the rotor position rotates by 360 degrees in the electrical angle in accordance with an angular zone which is one of the six angular zones acquired by equally dividing 360 degrees in the electrical angle in FIG. 5 and in which the rotor is located. In response to the drive signal, the inverter circuit 200 passes a current through 2-phase coils sequentially selected from the 3-phase coils to excite each-phase stator salient pole at a predetermined timing. Particularly at the start of the motor, the motor control circuit 300 in the present example embodiment inputs to the inverter circuit 200 the drive signal for achieving the excitation pattern illustrated in FIG. 7 or 11. The excitation pattern to be selected is determined in accordance with the desired rotational direction of the rotor.

The inverter circuit 200 illustrated in FIG. 15 is a general-purpose inverter circuit including a full-bridge inverter, and is connected to a DC power source 400 in use. The DC power source 400 may include a converter circuit (not illustrated) for converting a commercial AC voltage into a DC voltage.

The inverter circuit 200 in FIG. 15 includes switching elements $HS_1$, $HS_2$, $HS_3$, $LS_1$, $LS_2$, and $LS_3$. The switching elements $HS_1$, $HS_2$, $HS_3$, $LS_1$, $LS_2$, and $LS_3$ each may be a MOS electric field transistor (MOSFET) including a reflux diode, or a MOSFET connected in parallel to a reflux diode element. In place of the MOSFET, an insulated gate bipolar transistor (IGBT) may be used. These switching elements $HS_1$, $HS_2$, $HS_3$, $LS_1$, $LS_2$, and $LS_3$ constitute a 3-phase full-bridge circuit. A gate electrode (gate terminal) of each of the switching elements $HS_1$, $HS_2$, $HS_3$, $LS_1$, $LS_2$, and $LS_3$ is connected to the motor control circuit 300.

Describing in more detail, the switching elements HS' and LS' are connected to each other in series via a first node N1 between a high-side line PL connected to the positive side of the DC power source 400 and a low-side line NL connected to the negative side. The first node N1 is connected to one end of the coil around the U-phase salient pole in the SR motor 100. The switching elements $HS_2$ and $LS_2$ are connected to each other in series via a second node N2 between the high-side line PL and the low-side line NL. The second node N2 is connected to one end of the coil around the V-phase salient pole in the SR motor 100. The switching elements $HS_3$ and $LS_3$ are connected to each other in series via a third node N3 between the high-side line PL and the low-side line NL. The third node N3 is connected to one end of the coil around the W-phase salient pole in the SR motor 100.

In this example, the coil around the U-phase salient pole, the coil around the V-phase salient pole, and the coil around the W-phase salient pole are connected by a wye connection or a delta connection. Thus, for example, when a current passes through the coil around the U-phase salient pole, the current preferably returns through at least one of the coil around the V-phase salient pole and the coil around the W-phase salient pole. By using the inverter circuit 200 including such 3-phase full-bridge circuit, driving may be performed in accordance with the excitation pattern illustrated in FIG. 7 or 11, for example.

In the motor system according to the example embodiment of the present disclosure, by performing driving according to the above-mentioned excitation pattern, when the rotor is normally rotated from the stopped state (initial position), the total torque in the normal rotational direction may be generated irrespective of the stopped position of the rotor. Further, when the rotor is reversely rotated from the stopped position, the total torque in the reverse rotational direction may be generated irrespective of the stopped position of the rotor. Therefore, the torque in the desired direction may be generated to uniquely determine the rotational direction, thereby improving the starting characteristic of the reluctance motor.

Figure 16:
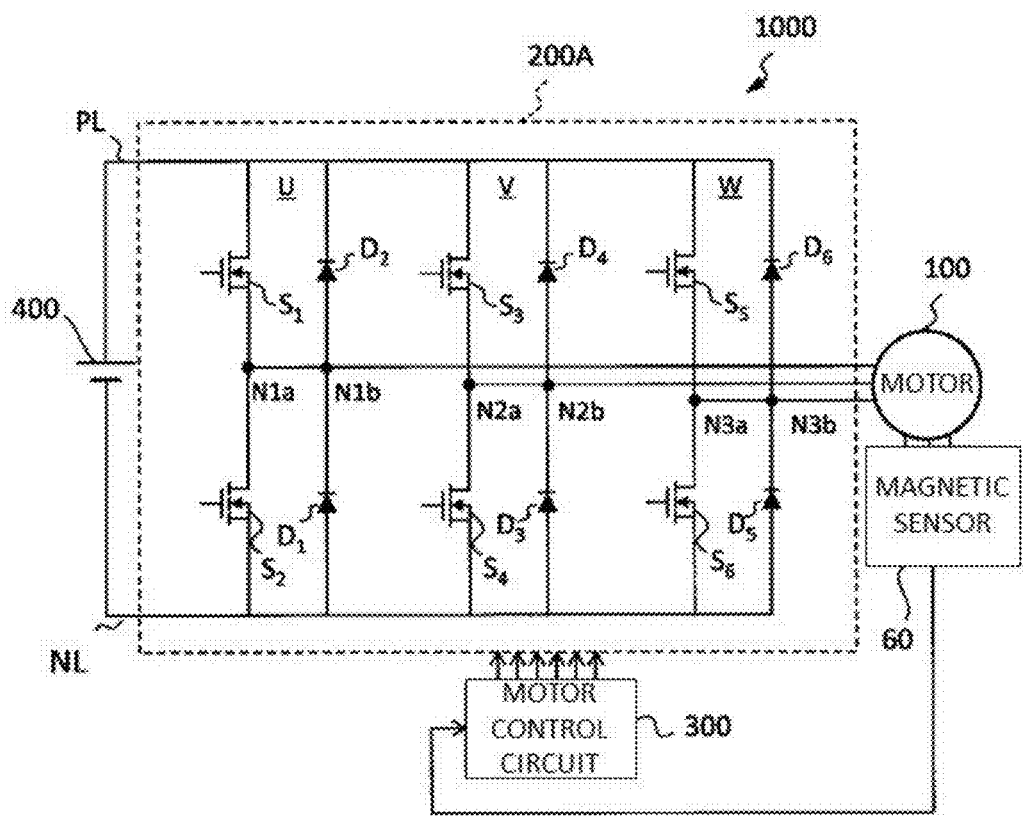
FIG. 16 is a circuit diagram of an example of another inverter circuit 200A including a 3-phase full-bridge circuit.

FIG. 16 is a circuit diagram illustrating another inverter circuit 200A including the 3-phase full-bridge circuit. The inverter circuit 200A illustrated in FIG. 16 includes switching elements $S_1$, $S_2$, $S_3$, $S_4$, $S_5$, and $S_6$ and diodes $D_1$, $D_2$, $D_3$, $D_4$, $D_5$, and $D_6$. The switching elements $S_1$, $S_2$, $S_3$, $S_4$, $S_5$, and $S_6$ each are typically, a MOSFET or an IGBT. The switching elements $HS_1$, $HS_2$, $HS_3$, $LS_1$, $LS_2$, and $LS_3$ and the diodes $D_1$, $D_2$, $D_3$, $D_4$, $D_5$, and $D_6$ constitute a 3-phase full-bridge circuit. A gate electrode of each of the switching elements $S_1$, $S_2$, $S_3$, $S_4$, $S_5$, and $S_6$ is connected to the motor control circuit 300.

Describing in more detail, the switching elements $S_1$ and $S_2$ are connected to each other in series via a first node N1$a$ between a high-side line PL and a low-side line NL. The diodes $D_1$ and $D_2$ are connected to each other in series via a second node Nib between the high-side line PL and the low-side line NL. Both of the first node N1$a$ and the second node Nib are connected to one end of the coil around the U-phase salient pole in the SR motor 100. The switching elements $S_3$ and $S_4$ are connected to each other in series via a third node N2$a$ between the high-side line PL and the low-side line NL. The diodes $D_3$ and $D_4$ are connected to each other in series via a fourth node N2$b$ between the high-side line PL and the low-side line NL. Both of the third node N2$a$ and the fourth node N2$b$ are connected to one end of the coil around the V-phase salient pole in the SR motor 100. The switching elements $S_5$ and $S_6$ are connected to each other in series via a fifth node N3$a$ between the high-side line PL and the low-side line NL. The diodes $D_5$ and the $D_6$ are connected to each other in series via a sixth node N3$b$ between the high-side line PL and the low-side line NL. Both of the fifth node N3$a$ and the sixth node N3$b$ are connected to one end of the coil around the W-phase salient pole in the SR motor 100.

The inverter circuit 200A illustrated in FIG. 16 may achieve driving according to the excitation pattern illustrated in FIG. 7 or 11, for example. Also in this example, the coil around the U-phase salient pole, the coil around the V-phase salient pole, and the coil around the W-phase salient pole are connected by a wye connection or a delta connection.

Figure 17:
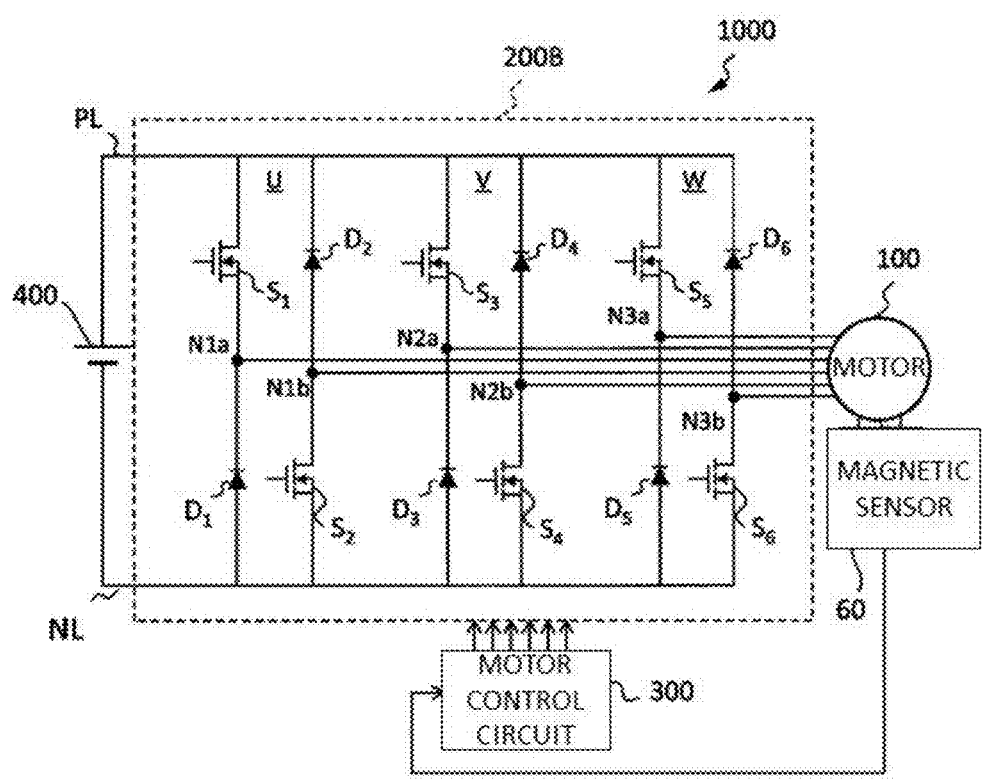
FIG. 17 is a circuit diagram of an example of an inverter circuit 200B including an asymmetric half-bridge inverter.

Next, referring to FIG. 17, the configuration of an inverter circuit 200B including an asymmetric half-bridge inverter. When the inverter circuit 200B is used, the coil around the U-phase salient pole, the coil around the V-phase salient pole, and the coil around the W-phase salient pole are not interconnected, and currents passing through respective coils may be independently controlled.

The inverter circuit 200B illustrated in FIG. 17 includes switching elements $S_1$, $S_2$, $S_3$, $S_4$, $S_5$, and $S_6$ and diodes $D_1$, $D_2$, $D_3$, $D_4$, $D_5$, and $D_6$. The switching elements $S_1$, $S_2$, $S_3$, $S_4$, $S_5$, and $S_6$ and the diodes $D_1$, $D_2$, $D_3$, $D_4$, $D_5$, and $D_6$ constitute a 3-phase half-bridge circuit. A gate electrode of each of the switching elements $S_1$, $S_2$, $S_3$, $S_4$, $S_5$, and $S_6$ is connected to the motor control circuit 300.

Describing in more detail, the switching element $S_1$ and the diode $D_1$ are connected to each other in series via a first node N1$a$ between a high-side line PL and a low-side line NL. The diode $D_2$ and the switching element $S_2$ are connected to each other in series via a second node Nib between the high-side line PL and the low-side line NL. The first node N1$a$ and the second node Nib are connected to both respective ends of the coil around the U-phase salient pole in the SR motor 100. The switching element $S_3$ and the diode $D_3$ are connected to each other in series via a third node N2$a$ between the high-side line PL and the low-side line NL. The diode $D_4$ and the switching element $S_4$ are connected to each other in series via a fourth node N2$b$ between the high-side line PL and the low-side line NL. Both of the third node N2$a$ and the fourth node N2$b$ are connected to both respective ends of the coil around the V-phase salient pole in the SR motor 100. The switching element $S_5$ and the diode $D_5$ are connected to each other in series via a fifth node N3$a$ between the high-side line PL and the low-side line NL. The diode $D_6$ and the switching element $S_6$ are connected to each other in series via a sixth node N3$b$ between the high-side line PL and the low-side line NL. Both of the fifth node N3$a$ and the sixth node N3$b$ are connected to both respective ends of the coil around the W-phase salient pole in the SR motor 100.

Figure 18:
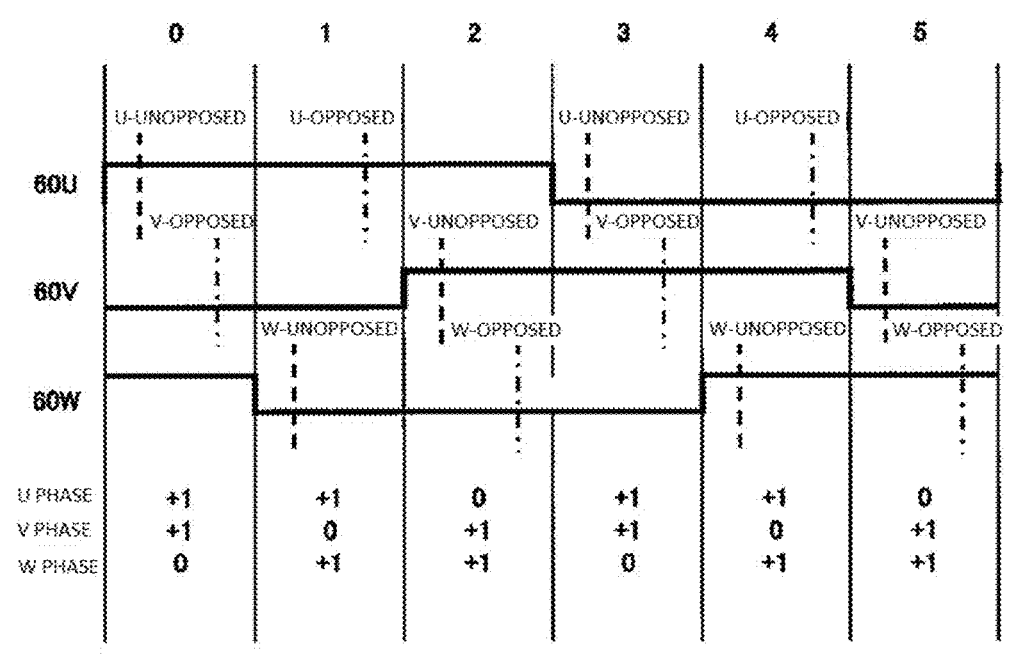

When the inverter circuit 200B illustrated in FIG. 17 is used, currents independently pass through the coil around the U-phase salient pole, the coil around the V-phase salient pole, and the coil around the coil around the W-phase salient pole in one direction. Thus, as illustrated in FIG. 18, the excitation state of the U-phase salient pole, the V-phase salient pole, and the W-phase salient pole may be represented as "+1" or "0". If the salient poles are connected such that the currents pass in opposite directions, the excitation state may be represented as "−1" or "0".

As described above, in the reluctance motor, the orientation of the current passing through the coil in the stator 20 does not affect a torque. Thus, the inverter circuit may have three asymmetric half-bridge inverters, or may have a 3-phase full-bridge inverter.

Figure 19:
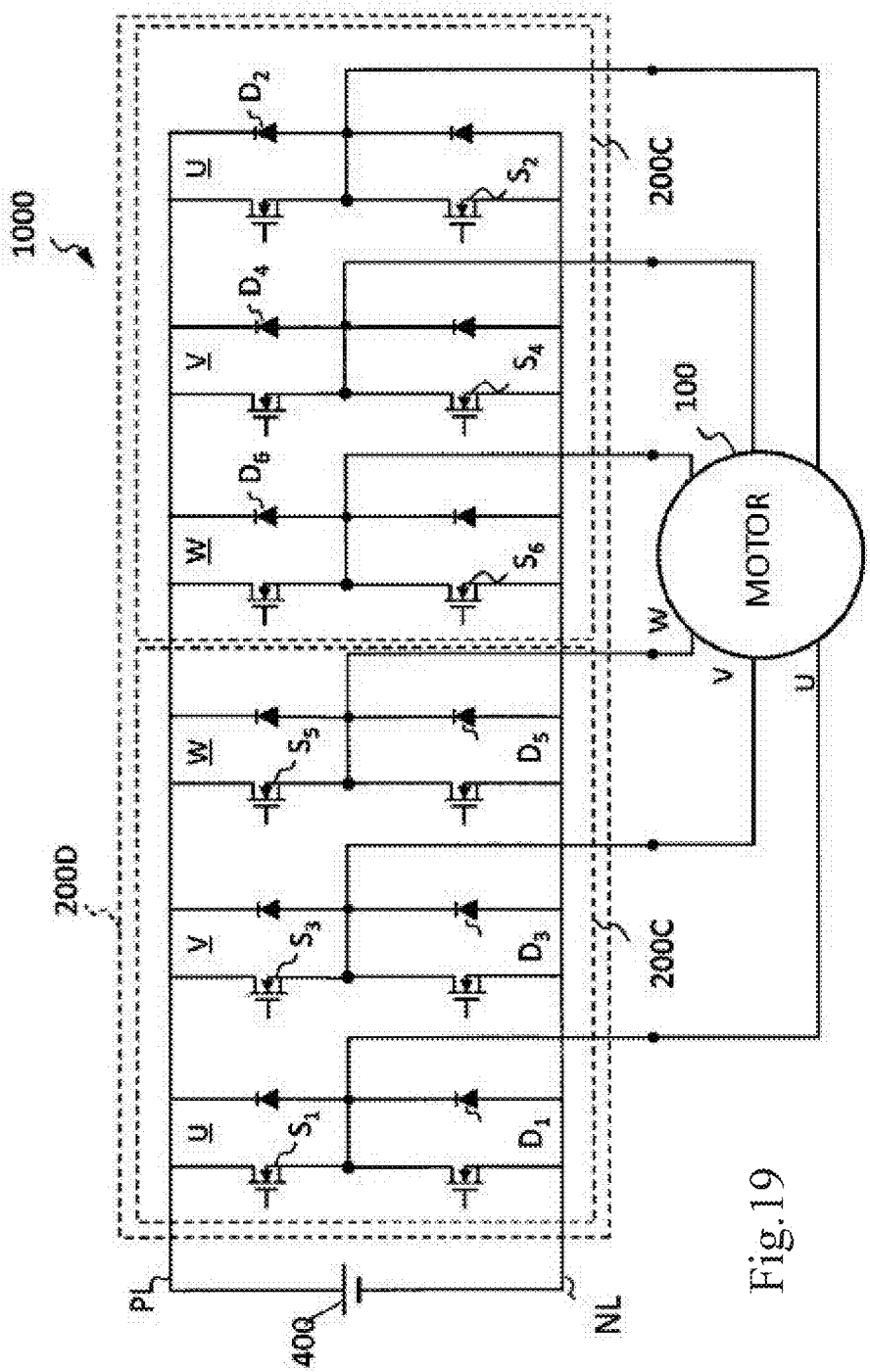
FIG. 19 is a circuit diagram of an inverter circuit 200D including a plurality of 3-phase full-bridge inverters 200C.

FIG. 19 is a circuit diagram of an inverter circuit 200D including two 3-phase full-bridge inverters 200C. The two 3-phase full-bridge inverters 200C each have the same configuration as the inverter circuit 200A in FIG. 16. The inverter circuits 200D may operate in the similar manner as the inverter circuit 200B in FIG. 17.

Figure 20:
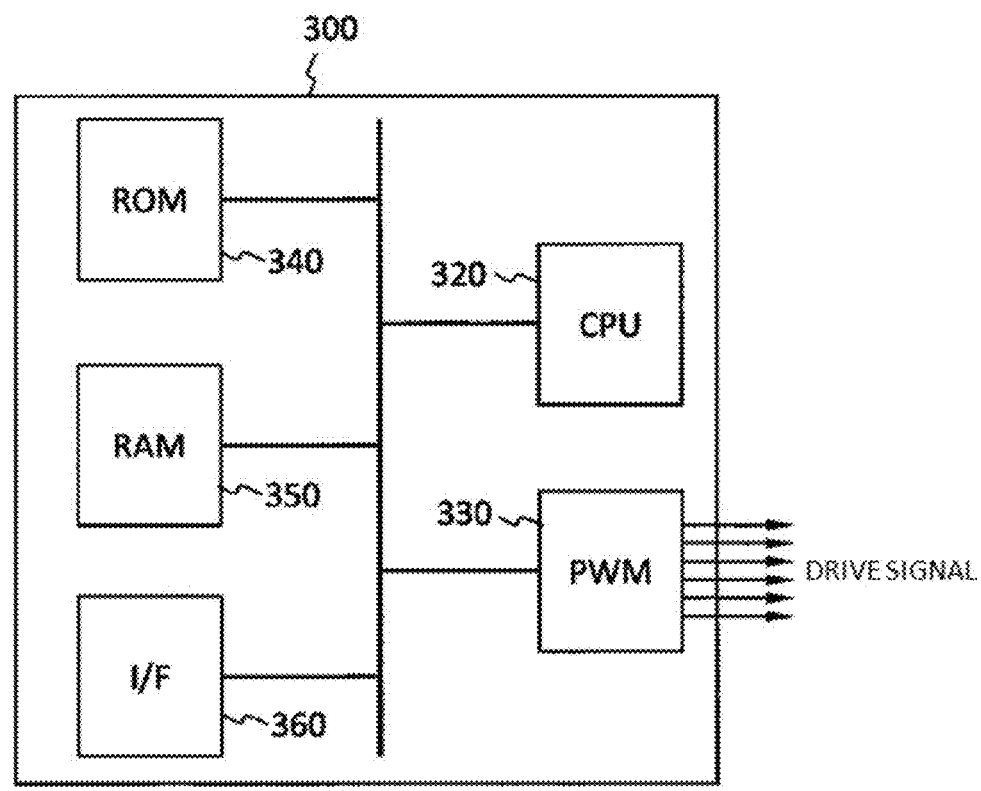
FIG. 20 is a view illustrating the hardware configuration of a motor control circuit 300 in the motor system of an example embodiment of the present disclosure.

FIG. 20 illustrates an example of the hardware configuration of the motor control circuit 300. The motor control circuit 300 in this example has a central processing unit (CPU) 320, a PWM circuit 330, a read only memory (ROM) 340, a random access memory (RAM) 350, and an input/output interface (I/F) 360, which are interconnected via a bus. Another circuit or device (AD converter or the like) may be additionally connected to the bus. The PWM circuit 330 sends a drive signal to the inverter circuit 200. The drive signal is inputted to a gate terminal of each switching element in the inverter circuit 200 to control ON/OFF of each switching elements. A program and data that define the operation of the CPU 320 are stored in at least one of the ROM 340 and RAM 350. Such motor control circuit 300 may be embodied as, for example, a general-purpose 32-bit microcontroller. The microcontroller may be formed of one or more integrated circuit chips.

Various operations of the motor control circuit 300 are defined by the program. According to the program, at the start of the motor, a drive signal for achieving the excitation pattern illustrated in FIG. 7 or 11 is generated and inputted to a gate terminal of each switching element in the inverter circuit 200. A drive signal generated after the start may be generated to achieve the well-known driving method according to the rotational speed and thus, details thereof are omitted. By updating a part or whole of contents of the program, a part or whole of the operations of the motor control circuit 300 may be changed. The program may be updated using a recording medium that stores the program, or via wired or wireless communication. The communication may be made using the I/F 360 illustrated in FIG. 20. The configuration of the motor control circuit 300 is not limited to the configuration illustrated in FIG. 20.

As apparent from the above-mentioned description, the motor system according to the example embodiment of the present disclosure may rapidly activating the rotor in any desired rotational direction by effectively utilizing the rotor position sensing technology using the magnetic sensor such as Hall IC, and the full-bridge inverter, which have been widely adopted in the permanent magnet-typed motor. The detection of the rotor position is not limited to the detection in the above example embodiment. Other rotor position sensing technologies may be used in place of the magnetic sensor.

The motor system of the present disclosure may be used in various machines, apparatuses, and drive sources for mobile body to convert electric power into mechanical energy.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor system comprising:
   a reluctance motor; and
   a circuit connected to the reluctance motor; wherein
   the reluctance motor includes:
      a rotor including N rotor salient poles where N is an integer of 2 or more;
      a stator including M stator salient poles where M is an integer of 3 or more;
      3-phase coils to excite the stator salient poles; and
      a sensor to detect a rotational position of the rotor; and
   the circuit applies 120-degree conduction to the 3-phase coils when the rotor is rotated in a first direction from a stopped state, and applies 180-degree conduction to the 3-phase coils when the rotor is rotated in a second direction that is opposite to the first direction from the stopped state.

2. The motor system according to claim 1, wherein
   the reluctance motor includes a shaft rotatably connected to the rotor;
   the sensor includes:
      a sensor magnet fixed to an outer circumference of the shaft, the sensor magnet including an S pole and an N pole alternately arranged in a circumferential direction of the shaft; and
      three magnetic sensors opposed to the sensor magnet; and
   a number of poles of the sensor magnet is N.

3. The motor system according to claim 1, wherein the 3-phase coils are connected by a wye connection or a delta connection.

4. The motor system according to claim 1, wherein the 3-phase coils are electrically isolated from one another.

5. The motor system according to claim 1, wherein the circuit includes:
   an inverter circuit electrically connected to the 3-phase coils of the reluctance motor; and
   a motor control circuit electrically connected to the inverter circuit; and
   the motor control circuit receives outputs of the magnetic sensors, and outputs a drive signal to switch a voltage applied to the 3-phase coils while the rotor rotates by 360 degrees in an electrical angle, in accordance with a zone which is one of six angular zones and in which the rotor is located, the six angular zones being acquired by equally dividing 360 degrees in the electrical angle.

6. The motor system according to claim 2, wherein N is four, and M is six.

7. The motor system according to claim 2, wherein the three magnetic sensors are three Hall ICs located at intervals of about 120 degrees in a mechanical angle.

8. The motor system according to claim 4, wherein in response to the drive signal, the inverter circuit passes a current to 2-phase coils sequentially selected from the 3-phase coils.

9. The motor system according to claim 6, wherein a boundary position between the S pole and the N pole of the sensor magnet is shifted from a position opposed to the three magnetic sensors by an electrical angle of about 10 degrees to about 20 degrees in the circumferential direction of the shaft.

10. The motor system according to claim 8, wherein the inverter circuit includes three asymmetric half-bridge inverters connected to the respective 3-phase coils.

11. The motor system according to claim 8, wherein the inverter circuit includes at least one 3-phase full-bridge inverter connected to the 3-phase coils.

* * * * *